(12) United States Patent
Kim et al.

(10) Patent No.: US 12,676,020 B2
(45) Date of Patent: Jul. 7, 2026

(54) DISPLAY APPARATUS HAVING SENSING CIRCUIT BOARD WITH AN ADHESIVE PATTERN LOCATED BETWEEN COVER PANEL AND SET ASSEMBLY, AND ELECTRONIC DEVICE

(71) Applicant: Samsung Display Co., Ltd., Yongin-Si (KR)

(72) Inventors: Seonkyong Kim, Yongin-si (KR); Hyunseung Koh, Yongin-si (KR); Namjin Jang, Yongin-si (KR); Younhwan Jung, Yongin-si (KR); Jaelok Cha, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 625 days.

(21) Appl. No.: 17/675,018

(22) Filed: Feb. 18, 2022

(65) Prior Publication Data

US 2022/0415077 A1    Dec. 29, 2022

(30) Foreign Application Priority Data

Jun. 23, 2021    (KR) ........................ 10-2021-0081661

(51) Int. Cl.
G06V 40/00        (2022.01)
G06V 40/13        (2022.01)
H04M 1/02         (2006.01)
(52) U.S. Cl.
CPC .......... *G06V 40/13* (2022.01); *H04M 1/0266* (2013.01); *H04M 1/0277* (2013.01); *H04M 2250/22* (2013.01)

(58) Field of Classification Search
CPC ... G06F 3/04142; G06F 1/1637; G06V 40/13; H04M 1/0266; H04M 1/0277; H04M 2250/22
See application file for complete search history.

(56) References Cited

U.S. PATENT DOCUMENTS

| | | | |
|---|---|---|---|
| 10,879,493 B2 | 12/2020 | Kim et al. | |
| 11,017,199 B2 | 5/2021 | Bae et al. | |

(Continued)

FOREIGN PATENT DOCUMENTS

| | | |
|---|---|---|
| CN | 109979336 A | 7/2019 |
| KR | 10-2019-0112223 A | 10/2019 |

(Continued)

*Primary Examiner* — Pakee Fang
(74) *Attorney, Agent, or Firm* — Innovation Counsel LLP

(57) ABSTRACT

A display apparatus includes a display panel including a first surface and a second surface that is opposite the first surface, a cover panel in which an opening portion overlapping the second surface of the display panel, the cover panel including a first cover surface facing the second surface of the display panel and a second cover surface opposite the first cover surface, a fingerprint sensor assembly including a sensing circuit board electrically connected to a fingerprint sensor in the opening portion, extending from a side of the opening portion to the second cover surface of the cover panel, and including a first edge and a second edge that are opposite each other, and an adhesive pattern located between the cover panel and the sensing circuit board, and having a width equal to or less than a distance between the first edge and the second edge.

20 Claims, 28 Drawing Sheets

(56)         References Cited

U.S. PATENT DOCUMENTS

2016/0313838 A1* 10/2016 Lee ..................... G06F 3/04164
2019/0059164 A1*  2/2019 Hassemer ............. G06F 1/1637
2019/0197944 A1   6/2019 Kim et al.
2020/0079127 A1*  3/2020 Hooton ................. G06F 1/1637
2020/0301482 A1   9/2020 Heo
2020/0394377 A1* 12/2020 Jang ....................... H05K 1/181
2021/0151511 A1   5/2021 Kim et al.

FOREIGN PATENT DOCUMENTS

KR      10-2019-0139753  A    12/2019
KR           10-2057568  B1   12/2019
KR      10-2020-0142157  A    12/2021

* cited by examiner

FIG. 3

DISPLAY APPARATUS HAVING SENSING CIRCUIT BOARD WITH AN ADHESIVE PATTERN LOCATED BETWEEN COVER PANEL AND SET ASSEMBLY, AND ELECTRONIC DEVICE

CROSS-REFERENCE TO RELATED APPLICATION

This application is based on and claims priority under 35 U.S.C § 119 to Korean Patent Application No. 10-2021-0081661, filed on Jun. 23, 2021, in the Korean Intellectual Property Office, the disclosure of which is incorporated by reference herein in its entirety.

BACKGROUND

1. Field

The technical field relates to a display apparatus including a fingerprint sensor and an electronic device including the display apparatus.

2. Description of the Related Art

An electronic device may interact a user by displaying an image and/or detecting the user's input. The electronic device may include a fingerprint sensor for detecting the user's fingerprint. The fingerprint sensor may operate using a capacitive method, an optical method, or an ultrasonic method.

SUMMARY

One or more embodiments may be related to a display apparatus and an electronic device including the display apparatus. The display apparatus and/or the electronic device may include a fingerprint sensor with improved reliability.

Additional aspects will be set forth in part in the description which follows and, in part, will be apparent from the description, or may be learned by practice of the presented embodiments.

According to one or more embodiments, a display apparatus includes a display panel including a first surface and a second surface that is opposite the first surface, a cover panel in which an opening portion is defined to overlap the second surface of the display panel, the cover panel including a first cover surface facing the second surface of the display panel and a second cover surface opposite the first cover surface, a fingerprint sensor assembly including a fingerprint sensor located in the opening portion, and a sensing circuit board electrically connected to the fingerprint sensor, extending from the fingerprint sensor to a side of the opening portion and from the side of the opening portion to the second cover surface of the cover panel, and including a first edge and a second edge that are opposite each other, and an adhesive pattern located between the cover panel and the sensing circuit board, and having a width equal to or less than a distance between the first edge and the second edge.

The cover panel may further include an inner surface defining the opening portion and connected to the first cover surface and the second cover surface of the cover panel, wherein a side surface of the adhesive pattern that is an edge of the adhesive pattern is connected to the inner surface of the cover panel.

The sensing circuit board may include a first connection area overlapping the fingerprint sensor, wherein a distance between the display panel and the sensing circuit board in the first connection area is less than a distance between the display panel and the sensing circuit board on the second cover surface of the cover panel.

The sensing circuit board may include a first connection area overlapping the fingerprint sensor, an overlapping area extending from the first connection area and at least partially overlapping the adhesive pattern, and a first area extending from the overlapping area and in which each of the first edge and the second edge has a curved shape.

The sensing circuit board may further include a second area extending from the first area in one direction, wherein the overlapping area extends in one direction, and in the first area, each of the first edge and the second edge extends in a semicircular shape.

In the overlapping area, each of the first edge and the second edge may extend in a curved shape, wherein, in the overlapping area, a curvature of the first edge is greater than a curvature of the second edge, and in the first area, a curvature of the first edge is less than a curvature of the second edge.

The display apparatus may further include a main circuit board connected to the display panel and the fingerprint sensor assembly, wherein the sensing circuit board further includes a first intermediate area extending from the first area in one direction, a second intermediate area extending from the first intermediate area and in which each of the first edge and the second edge has a curved shape, a second area extending from the second intermediate area in one direction, a third area extending from the second area and in which each of the first edge and the second edge has a curved shape, and a second connection area extending from the third area and connected to the main circuit board.

At least one of the first edge and the second edge of the sensing circuit board may extend from the first connection area to the overlapping area in one direction.

In the first area, a curvature of the first edge may be less than a curvature of the second edge, wherein the first edge extends from the first connection area to the overlapping area, and at least a part of the second edge extends from the first connection area to the overlapping area to be closer to the first edge.

The cover panel may include a plurality of layers, wherein the adhesive pattern is located between the sensing circuit board and the plurality of layers.

According to one or more embodiments, a display apparatus includes a display panel including a first surface and a second surface that is opposite the first surface, a cover panel in which an opening portion is defined to overlap the second surface of the display panel, the cover panel including a first cover surface facing the second surface and a second cover surface opposite the first cover surface, and a fingerprint sensor assembly including a fingerprint sensor located in the opening portion, and a sensing circuit board electrically connected to the fingerprint sensor, extending from the fingerprint sensor to a side of the opening portion and from the side of the opening portion to the second cover surface of the cover panel, and including a first edge and a second edge that are opposite each other, wherein the sensing circuit board includes a first connection area overlapping the fingerprint sensor, an overlapping area extending from the first connection area and at least partially overlapping the second cover surface of the cover panel, and a first area extending from the overlapping area and in which each of the first edge and the second edge has a curved shape, wherein the first edge extends from the first connection area to the overlapping area in one direction, and at least a part of the second edge extends from the first connection area to the overlapping area to be closer to the first edge.

In the first area, a curvature of the first edge may be less than a curvature of the second edge.

The sensing circuit board may further include a second area extending from the first area in one direction, wherein the overlapping area extends in one direction, and in the first area, each of the first edge and the second edge extends in a semicircular shape.

In the overlapping area, each of the first edge and the second edge may extend in a curved shape, wherein, in the overlapping area, a curvature of the first edge is greater than a curvature of the second edge, and in the first area, a curvature of the first edge is less than a curvature of the second edge.

The display apparatus may further include a main circuit board connected to the display panel and the fingerprint sensor assembly, wherein the sensing circuit board further includes a first intermediate area extending from the first area in one direction, a second intermediate area extending from the first intermediate area and in which each of the first edge and the second edge has a curved shape, a second area extending from the second intermediate area in one direction, a third area extending from the second area and in which each of the first edge and the second edge of the sensing circuit board has a curved shape, and a second connection area extending from the third area and connected to the main circuit board.

The display apparatus may further include an adhesive pattern located between the cover panel and the sensing circuit board, and having a width equal to or less than a distance between the first edge and the second edge.

According to one or more embodiments, an electronic device includes a display apparatus, and a set assembly located behind the display apparatus, wherein the display apparatus includes a display panel including a first surface and a second surface that is opposite the first surface, a cover panel in which an opening portion is defined to overlap the second surface of the display panel, the cover panel including a first cover surface facing the second surface and a second cover surface opposite the first cover surface, a fingerprint sensor assembly including a fingerprint sensor located in the opening portion, and a sensing circuit board electrically connected to the fingerprint sensor, extending from the fingerprint sensor to a side of the opening portion and from the side of the opening portion to the second cover surface and including a first edge and a second edge that are opposite each other, and an adhesive pattern located between the cover panel and the sensing circuit board, and having a width equal to or less than a distance between the first edge and the second edge of the sensing circuit board.

The cover panel may further include an inner surface defining the opening portion and connected to the first cover surface and the second cover surface, wherein a side surface of the adhesive pattern that is an edge of the adhesive pattern is connected to the inner surface of the cover panel.

The sensing circuit board may include a first connection area overlapping the fingerprint sensor, an overlapping area extending from the first connection area and at least partially overlapping the adhesive pattern, and a first area extending from the overlapping area and in which each of the first edge and the second edge has a curved shape, wherein, in the first area, a curvature of the first edge is less than a curvature of the second edge, wherein the first edge extends from the first connection area to the overlapping area in one direction, and at least a part of the second edge extends from the first connection area to the overlapping area to be closer to the first edge.

The set assembly may include at least one of a bracket, an electronic module, and a battery, and may at least partially overlap the fingerprint sensor assembly.

BRIEF DESCRIPTION OF THE DRAWINGS

The above and other aspects, features, and advantages of certain embodiments will be more apparent from the following description taken in conjunction with the accompanying drawings, in which:

FIG. 3 is a block diagram illustrating the electronic device of FIG. 1, according to an embodiment;

Each of FIG. 4A

Each of FIG. 6A, FIG. 6B, FIG. 6C.

Each of FIG. 8A, FIG. 8B, FIG. 8C.

Each of FIG. 11A, FIG. 11B.

Each of FIG. 13A, FIG. 13B, FIG. 13C.

DETAILED DESCRIPTION

Figure 1:
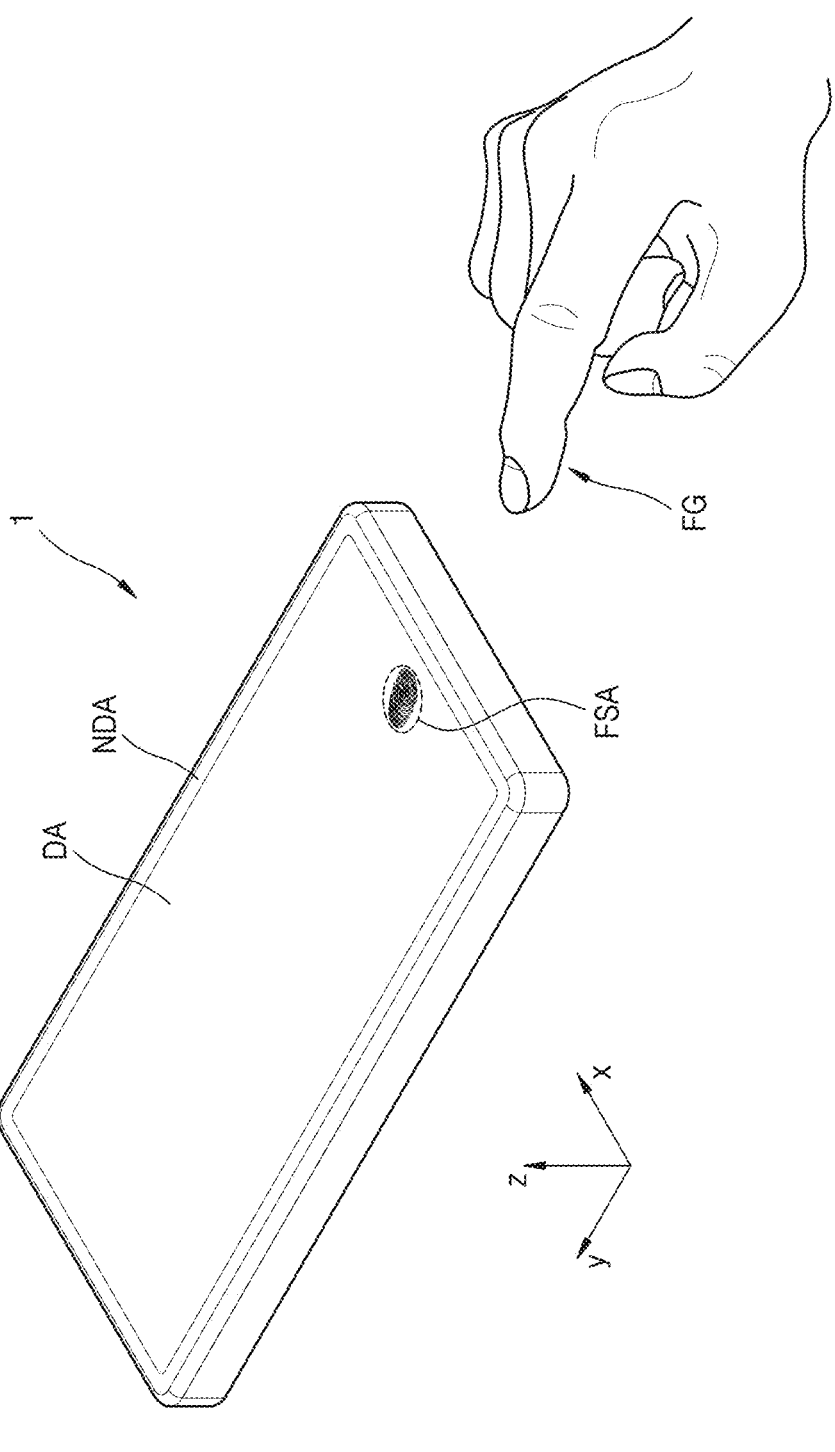
FIG. 1 is a perspective view illustrating an electronic device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Reference will now be made in detail to embodiments, examples of which are illustrated in the accompanying drawings, and in the drawings, the same elements are denoted by the same reference numerals, and thus a repeated description thereof will be omitted.

Although the terms "first," "second," etc. may be used to describe various elements, these elements should not be limited by these terms. These terms are only used to distinguish one element from another. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

As used herein, the singular forms "a," "an," and "the" are intended to include the plural forms as well, unless the context clearly indicates otherwise.

It will be further understood that the terms "comprises" or "comprising" used herein specify the presence of stated features or components, but do not preclude the presence or addition of one or more other features or components.

It will be further understood that, when a layer, region, or component is referred to as being "on" another layer, region, or component, it may be directly on the other layer, region, or component, or may be indirectly on the other layer, region, or component with intervening layers, regions, or components therebetween.

Sizes of components in the drawings may be exaggerated or contracted for convenience of explanation. For example, because sizes and thicknesses of elements in the drawings are arbitrarily illustrated for convenience of explanation, the disclosure is not limited thereto.

When a certain embodiment may be implemented differently, a specific process order may be different from the described order. For example, two consecutively described processes may be performed substantially at the same time or may be performed in an order opposite the described order.

The term "connect" may mean "directly connect" or "indirectly connect." The term "connect" may mean "electrically connect." The term "insulate" may mean "electrically insulate" or "electrically isolate." The term "conductive" may mean "electrically conductive." The term "drive" may mean "operate" or "control." The term "include" may mean "be made of." The term "adjacent" may mean "immediately adjacent." The expression that an element extends in a particular direction may mean that the element extends lengthwise in the particular direction and/or that the lengthwise direction of the element is in the particular direction. The term "pattern" may mean "member." The term "adhesive pattern" may mean "adhesive member" or "adhesive."

The term "opening portion" may mean "opening," "hole," and/or "through hole." The term "cover panel" may mean "support panel" or "accommodating panel." The expression that an opening overlaps an object may mean that the opening exposes the object and/or the position of the opening overlaps with the position of the object.

Figure 2:
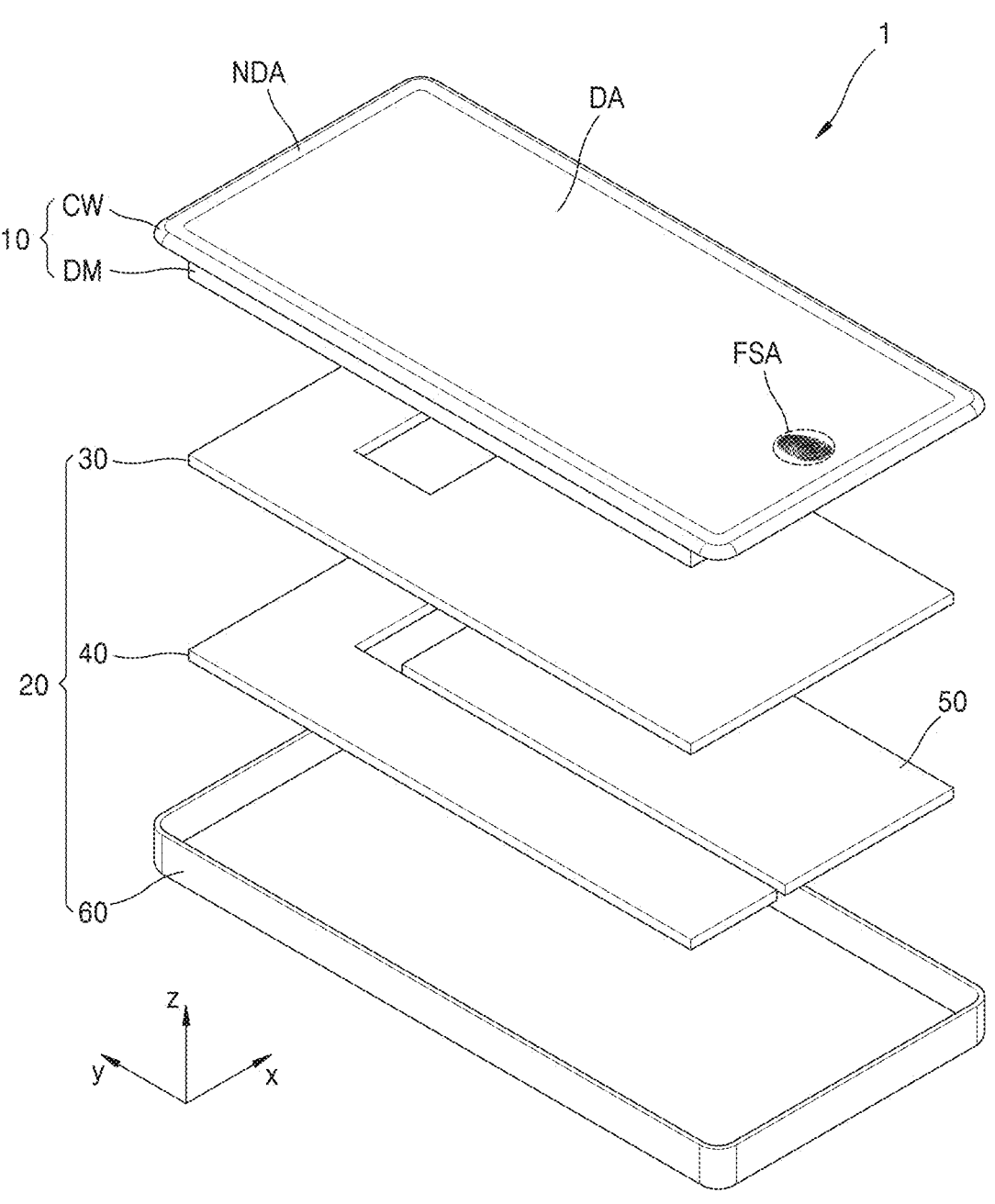
FIG. 2 is an exploded perspective view illustrating the electronic device of FIG. 1, according to an embodiment.

FIG. 1 is a perspective view illustrating an electronic device 1, according to an embodiment. FIG. 2 is an exploded perspective view illustrating the electronic device 1 of FIG. 1 according to an embodiment.

Referring to FIG. 1, the electronic device 1 may be activated according to an electrical signal. In an embodiment, the electronic device 1 may be a portable electronic device such as a mobile phone, a smartphone, a tablet personal computer (PC), a mobile communication terminal, an electronic organizer, an electronic book, a portable multimedia player (PMP), a navigation device, or an ultramobile PC (UMPC). In another embodiment, the electronic device 1 may be a wearable electronic device such as a smart watch or a watch phone. In another embodiment, the electronic device 1 may include a center information display (CID) located on a center fascia or a dashboard of a vehicle, a room mirror display replacing a side-view mirror of a vehicle, or a display located on the back of a front seat for entertainment for a back seat of a vehicle. However, the electronic device 1 is not limited thereto, and may also be applied to a large electronic device including a large display. In FIG. 1, the electronic device 1 is a smartphone, and the following will be described in detail assuming that the electronic device 1 is a smartphone.

The electronic device 1 may display an image. In an embodiment, the electronic device 1 may include a display area DA and a non-display area NDA. The display area DA may display different images according to different input signals. The non-display area NDA may at least partially surround the display area DA and may not display images.

In an embodiment, the display area DA may extend in a first direction (e.g., an x direction or a −x direction) and a second direction (e.g., a y direction or a −y direction). The display area DA may be flat. In another embodiment, the display area DA may be bent or curved. In an embodiment, light emitted from the display area DA may travel in a third direction (e.g., a z direction or a −z direction). Alternatively, light emitted from the display area DA may travel in a direction oblique to the third direction.

The electronic device 1 may detect a user's fingerprint FG applied from the outside. The electronic device 1 may detect a user's fingerprint FG when the user's finger touches the electronic device 1. The electronic device 1 may include a fingerprint sensing area FSA, and the electronic device 1 may detect the user's fingerprint FG in the fingerprint sensing area FSA. In an embodiment, the fingerprint sensing area FSA may overlap the display area DA. In this case, the fingerprint sensing area FSA may be an area where an image is displayed and also the user's fingerprint FG applied from the outside is detected. In another embodiment, the fingerprint sensing area FSA may overlap the non-display area NDA.

The user's fingerprint FG may include a surface state of the user's hand, for example, a surface uniformity or a surface roughness. Although the user's fingerprint FG is detected in FIG. 1, in another embodiment, when an input of an object other than the fingerprint is provided to the electronic device 1, the electronic device 1 may detect surface information of the object other than the fingerprint.

Referring to FIG. 2, the electronic device 1 may include a display apparatus 10 and a set assembly 20. The display apparatus 10 may include a cover window CW and a display module DM. The set assembly 20 may be located behind the display apparatus 10. In other words, the set assembly 20 may face a surface of the display apparatus 10 opposite the display area DA. The set assembly 20 may include at least one of a bracket 30, an electronic module 40, and a battery 50. In an embodiment, the set assembly 20 may include the bracket 30, the electronic module 40, the battery 50, and an outer case 60. Shapes and overlapping relationships of the bracket 30, the electronic module 40, the battery 50, and the outer case 60 are not limited to those in FIG. 2. In another embodiment, the bracket 30, the electronic module 40, the battery 50, and the outer case 60 may have various shapes and overlapping relationships.

The cover window CW may protect elements of the electronic device 1 from an external impact. The cover window CW may define the display area DA and the non-display area NDA of the electronic device 1. The cover window CW may include at least one of glass, sapphire, and plastic. The cover window CW may include, for example, ultra-thin glass (UTG™) or colorless polyimide.

The display module DM may be located under the cover window CW. In an embodiment, the display module DM may include a display panel and a fingerprint sensor assembly. The display panel may be an element for substantially generating an image. The image generated by the display panel may be displayed in the display area DA through the cover window CW and may be visible to the user. The fingerprint sensor assembly may detect the user's fingerprint or surface information of an object other than the fingerprint provided to the fingerprint sensing area FSA.

The bracket 30 may be coupled to the display apparatus 10 and/or the outer case 60. The bracket 30 may divide an inner space of the electronic device 1. The bracket 30 may accommodate elements of the electronic device 1. The bracket 30 may support and secure the display apparatus 10. A coupling groove corresponding to a shape of the electronic module 40 may be defined in the bracket 30 so that the electronic module 40 is fixed. The bracket 30 may include metal and/or plastic. Although one bracket 30 is illustrated in FIG. 2, in another embodiment, the electronic device 1 may include a plurality of brackets 30.

The electronic module 40 may be connected to the display apparatus 10. In an embodiment, the electronic module 40 may be mechanically and/or electrically connected to the display apparatus 10. The display apparatus 10 may receive information about an image to be displayed through the electronic module 40, or may provide fingerprint information of the user to the electronic module 40. Accordingly, the electronic module 40 may provide information processed based on the fingerprint information to the user.

The electronic module 40 may be mounted on a mother board and may include a functional module for operating the electronic device 1. The mother board may be electrically connected to the display apparatus 10. In an embodiment, the mother board may include a rigid printed circuit board.

The battery 50 may supply power required for an overall operation of the electronic device 1. In an embodiment, the battery 50 may be electrically connected to at least one of the display apparatus 10 and the electronic module 40.

The outer case 60 may be coupled to the bracket 30 and/or the display apparatus 10. The outer case 60 may form an outer appearance of the electronic device 1 together with the cover window CW. Although the outer case 60 including one body is illustrated in FIG. 2, in another embodiment, the outer case 60 may include a plurality of bodies that are assembled with one another. The outer case 60 may include a plurality of frames and/or plates including at least one of glass, plastic, and metal.

Figure 3:
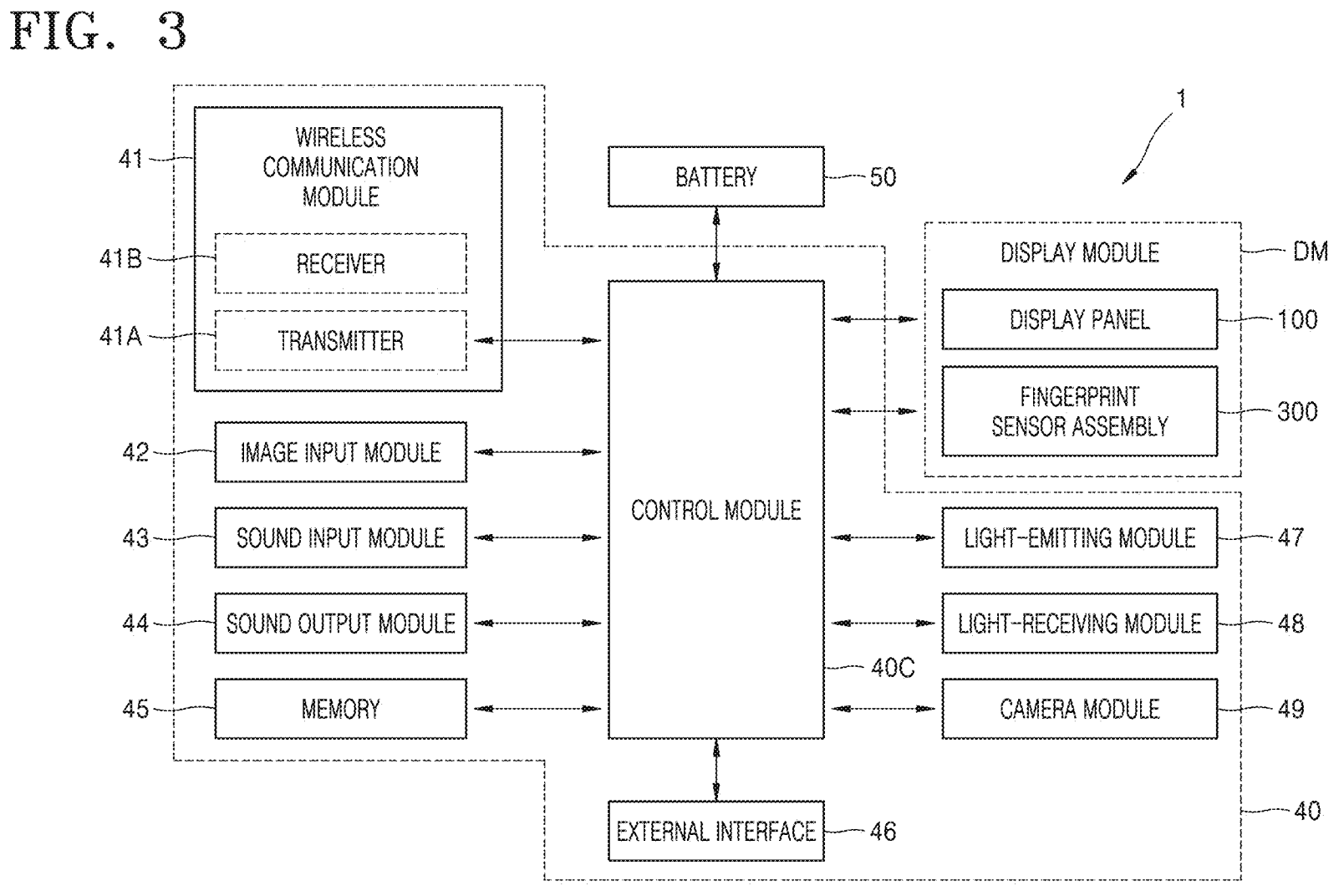

FIG. 3 is a block diagram illustrating the electronic device 1, according to an embodiment.

Referring to FIG. 3, the electronic module 40 may include a control module 40C, a wireless communication module 41, an image input module 42, a sound input module 43, a sound output module 44, a memory 45, an external interface 46, a light-emitting module 47, a light-receiving module 48, and a camera module 49. In an embodiment, some of elements of the electronic module 40 may not be mounted on a mother board, but may be electrically connected to the mother board through a flexible circuit board.

The control module 40C may control an overall operation of the electronic device 1. The control module 40C may be a microprocessor. In an embodiment, the control module 40C may activate or deactivate the display module DM. The control module 40C may control at least one of the image input module 42, the sound input module 43, and the sound output module 44 based on a touch signal received from the display module DM.

The wireless communication module 41 may transmit and/or receive a signal to/from another terminal by using at least one of radio frequency (RF), Bluetooth, Wi-Fi, wireless local area network (LAN), infrared communication, ultra-wideband (UWB), ZigBee, and near-field communication (NFC). The wireless communication module 41 may transmit and/receive a voice signal by using a general communication line. The wireless communication module 41 may include a transmitter 41A for transmitting a signal to be transmitted, and a receiver 41B for demodulating a received signal.

The image input module 42 may process an image signal into image data displayable on the display module DM. The sound input module 43 may receive an external sound signal through a microphone in a recording mode or a voice recognition mode and may convert the external sound signal into electrical voice data. The sound output module 44 may convert sound data received from the wireless communication module 41 or sound data stored in the memory 45 and may output the sound data (e.g., the converted sound data) to the outside.

The external interface 46 may function as an interface connected to an external charger, a wired and/or wireless data port, or a card socket. The card in the card socket may be at least one of a memory card, a subscriber identification module (SIM) card, and a user identification module (UIM) card.

The light-emitting module 47 may generate and output light. The light-emitting module 47 may output infrared rays. In an embodiment, the light-emitting module 47 may include a light-emitting diode (LED) device. The light-receiving module 48 may detect infrared rays. The light-receiving module 48 may be activated when infrared rays equal to or higher than a certain level are detected. In an embodiment, the light-receiving module 48 may include a complementary metal-oxide-semiconductor (CMOS) sensor. After infrared rays generated by the light-emitting module 47 are output, the infrared rays may be reflected by an external object (e.g., a user's finger or face) and then may be incident on the light-receiving module 48.

The camera module 49 may capture an external image.

Figure 4A:
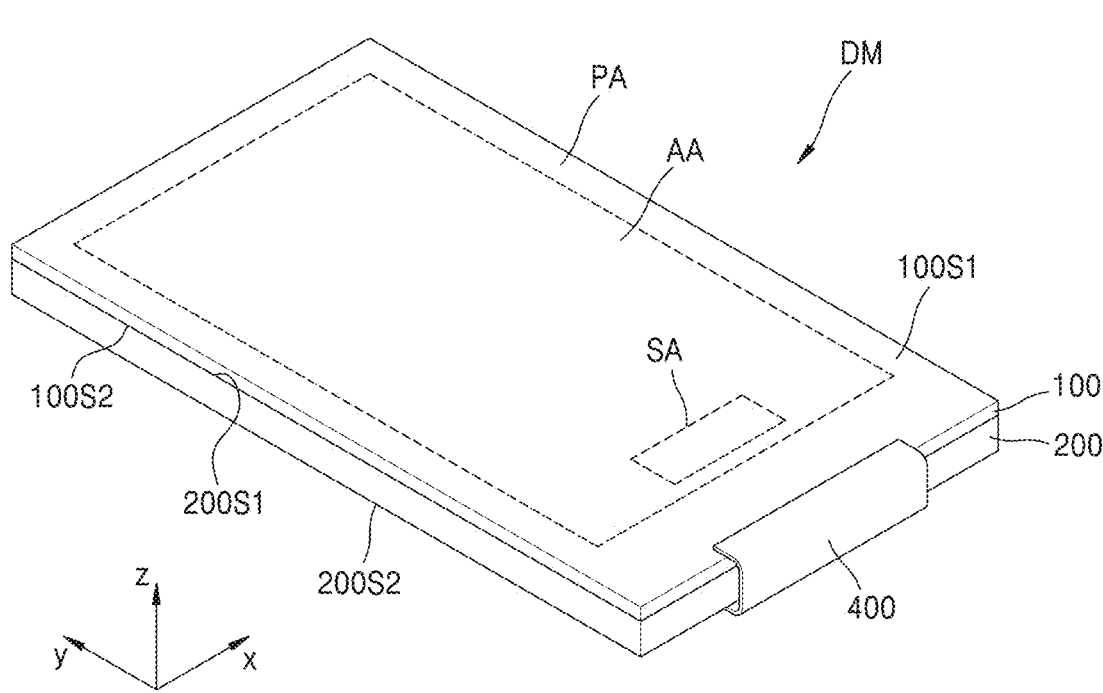
FIG. 4B is a perspective view illustrating a display module, according to an embodiment.
Figure 4B:
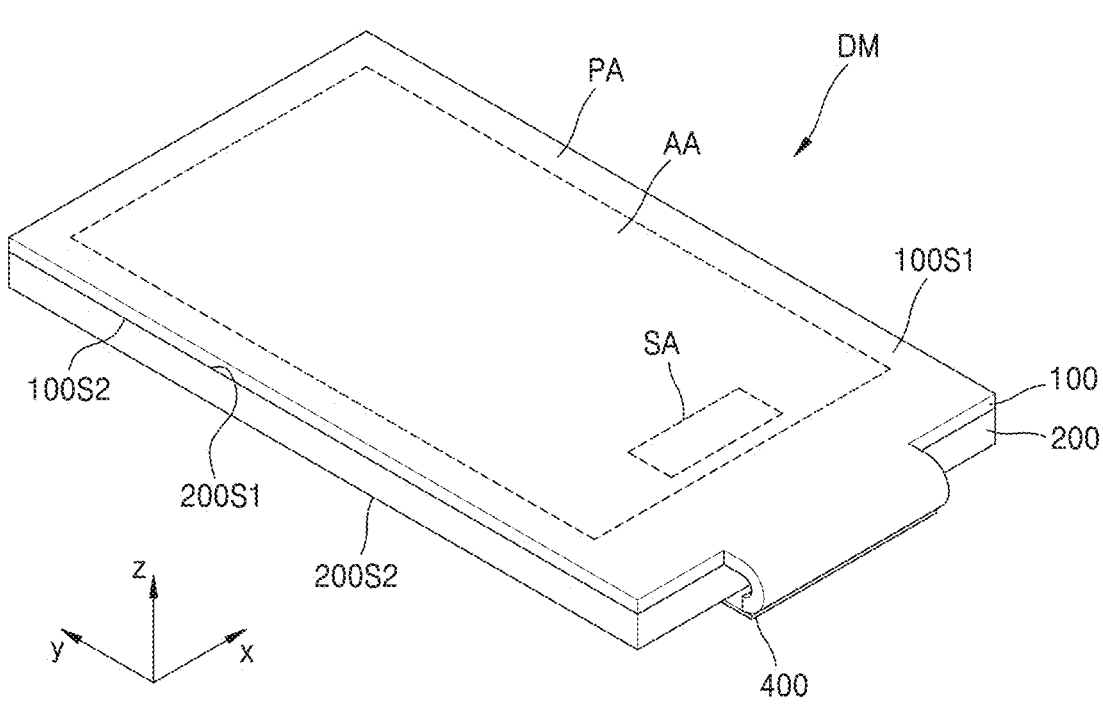

Each of FIG. 4A and FIG. 4B is a perspective view illustrating the display module DM, according to an embodiment. In FIGS. 4A and 4B, elements other than a cover window of a display apparatus are schematically illustrated.

Referring to FIGS. 4A and 4B, the display module DM may include a display panel 100, a cover panel 200 (or support/accommodating panel), and a main circuit board 400. The display panel 100 may display an image. The display panel 100 may include a first surface 100S1 and a second surface 100S2. The first surface 100S1 may include an active area AA and a peripheral area PA. The active area AA may be activated according to an electrical signal. The active area AA may be activated so that the display apparatus displays an image. The display panel 100 may display different images in the activated active area AA according to different signals or data. The display panel 100 may include a sensing area SA. In an embodiment, the sensing area SA may be an area where an image is displayed and a fingerprint is detected. The peripheral area PA may at least partially surround the active area AA. In the peripheral area PA, the display panel 100 may be electrically connected to the main circuit board 400. The second surface 100S2 may be a surface opposite the first surface 100S1. In an embodiment, the first surface 100S1 may be a front surface of the display panel 100, and the second surface 100S2 may be a rear surface of the display panel 100.

The display panel 100 may be an organic light-emitting display panel using an organic light-emitting diode including an organic emission layer as a display element. Alternatively, the display panel 100 may be a light-emitting diode display panel using a light-emitting diode (LED) as a display element. The light-emitting diode may have a micro-scale or nano-scale size. For example, the light-emitting diode may be a micro-light-emitting diode. Alternatively, the light-emitting diode may be a nanorod light-emitting diode. The nanorod light-emitting diode may include gallium nitride (GaN). In an embodiment, a color conversion layer may be located on the nanorod light-emitting diode. The color conversion layer may include quantum dots. Alternatively, the display panel 100 may be a quantum dot light-emitting display panel using a quantum dot light-emitting diode including a quantum dot emission layer as a display element. Alternatively, the display panel 100 may be an inorganic light-emitting display panel using an inorganic light-emitting diode including an inorganic semiconductor as a display element.

The cover panel 200 may be located on the second surface 100S2 of the display panel 100. In other words, the cover panel 200 may be located on a rear surface of the display panel 100. The cover panel 200 may include a first cover surface 200S1 and a second cover surface 200S2. The first cover surface 200S1 may face the second surface 100S2 of the display panel 100. The second cover surface 200S2 may be a surface opposite the first cover surface 200S1. In an embodiment, the first cover surface 200S1 may be a front surface of the cover panel 200. The second cover surface 200S2 may be a rear surface of the cover panel 200.

The main circuit board 400 may generate a signal for controlling an image or a power signal and may apply the signal to the display panel 100. Although not shown in FIGS. 4A and 4B, a main driving device for generating or processing an electrical signal may be located on the main circuit board 400. The main circuit board 400 may be connected to the display panel 100. In an embodiment, the main circuit board 400 may be mechanically and/or electrically connected to the display panel 100. At least a part of the main circuit board 400 may be located on the first surface 100S1 of the display panel 100. The main circuit board 400 may be connected to the first surface 100S1 of the display panel 100.

In an embodiment, the main circuit board 400 may include a flexible printed circuit board. In another embodiment, the main circuit board 400 may include a rigid printed circuit board. In another embodiment, the main circuit board 400 may include a flexible printed circuit board and a rigid printed circuit board.

Referring to FIG. 4A, the main circuit board 400 may be bent toward the second surface 100S2 of the display panel 100.

Referring to FIG. 4B, a width of a part of the peripheral area PA of the display panel 100 electrically and directly connected to the main circuit board 400 may be less than a width of the active area AA of the display panel 100. For example, a width of a part of the peripheral area PA of the display panel 100 electrically and directly connected to the main circuit board 400 in the first direction (e.g., the x direction or the –x direction) may be less than a width of the active area AA in the first direction (e.g., the x direction or the –x direction). The part of the peripheral area PA of the display panel 100 electrically connected to the main circuit board 400 may be bent. For example, the part of the peripheral area PA of the display panel 100 electrically connected to the main circuit board 400 may be bent toward the second surface 100S2 of the display panel 100. In this case, in some embodiments, the main circuit board 400 may not be bent.

Figure 5:
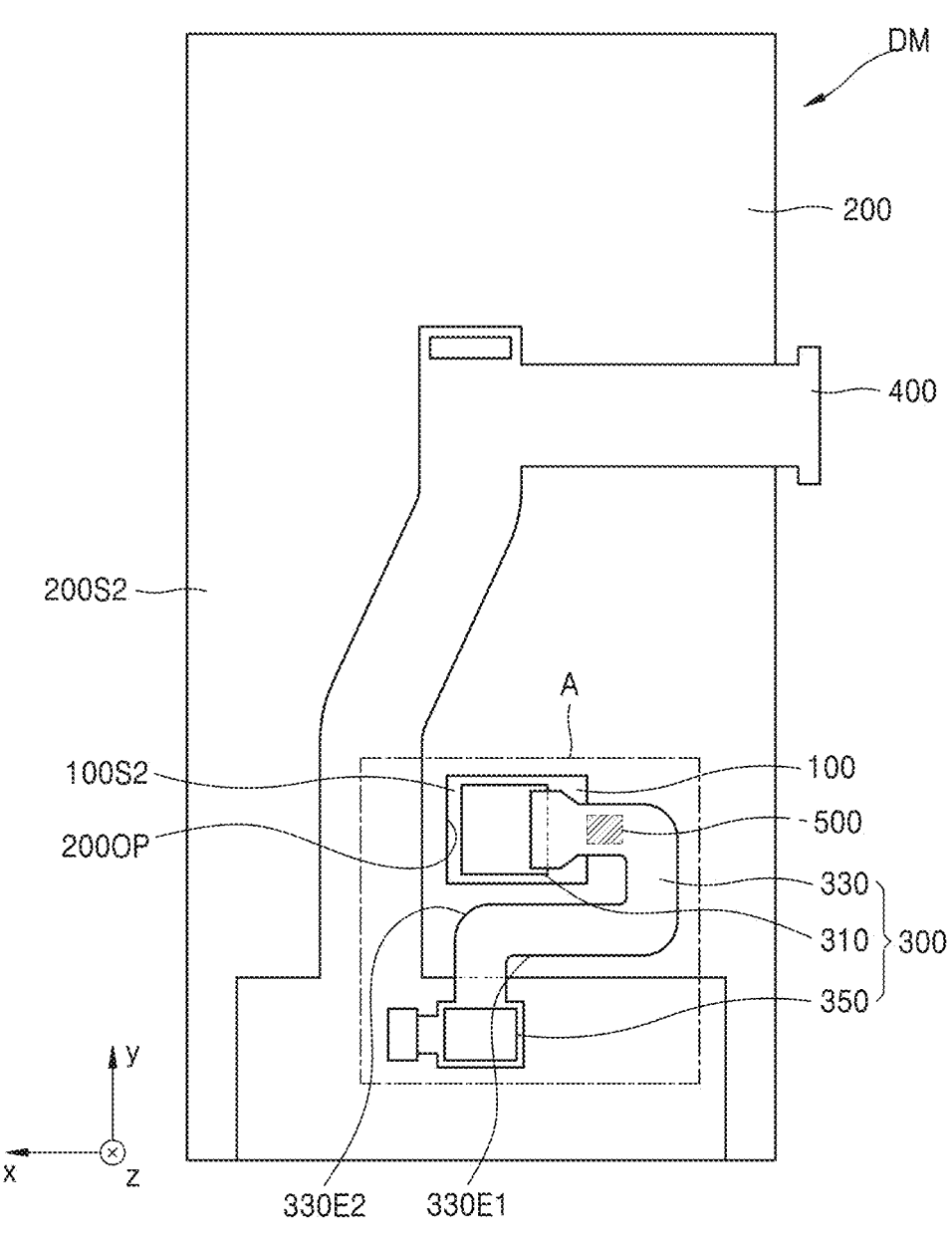
FIG. 5 is a plan view illustrating a rear surface of a display module, according to an embodiment.

FIG. 5 is a plan view illustrating a rear surface of the display module DM, according to an embodiment. In FIG. 5, the same members as those in FIG. 4A or 4B are denoted by the same reference numerals, and thus a repeated description thereof will be omitted.

Referring to FIG. 5, the display module DM may include the display panel 100, the cover panel 200 (or support/accommodating panel), a fingerprint sensor assembly 300, the main circuit board 400, and an adhesive pattern 500. In some embodiments, the display module DM may include the display panel 100, the cover panel 200, the fingerprint sensor assembly 300, and the main circuit board 400. The adhesive pattern 500 may be optional.

The display panel 100 may display an image. The display panel 100 may include a first surface and the second surface 100S2. The first surface may include an active area and a peripheral area. The second surface 100S2 may be a surface opposite the first surface.

The cover panel 200 may be located on the second surface 100S2 of the display panel 100. The cover panel 200 may include a first cover surface and the second cover surface 200S2. The first cover surface may face the second surface 100S2 of the display panel 100. The second cover surface 200S2 may be a surface opposite the first cover surface.

An opening portion 200OP may be defined or formed in the cover panel 200 to overlap the second surface 100S2 of the display panel 100. The opening portion 200OP may pass through the first cover surface and the second cover surface 200S2 of the cover panel 200. The opening portion 200OP may overlap with a sensing area of the display panel 100.

The opening portion 200OP may expose at least a part of the second surface 100S2. Although the opening portion 200OP has a quadrangular shape in a plan view of FIG. 5, in another embodiment, the opening portion 200OP may have a polygonal shape other than a quadrangular shape, a circular shape, an elliptical shape, or a curved shape.

The cover panel 200 may include a plurality of layers. For example, the cover panel 200 may include a first layer, a second layer, and a third layer. The first layer, the second layer, and the third layer may be sequentially stacked, and the opening portion 200OP may pass through the first layer, the second layer, and the third layer. In an embodiment, the first layer may be a cushion layer. The second layer may be a heat-dissipating layer. The third layer may be a light-blocking layer. The cover panel 200 may further include one or more additional layers.

The fingerprint sensor assembly 300 may include a fingerprint sensor 310, a sensing circuit board 330, and a sensing driving device 350. The fingerprint sensor assembly 300 may be located on the second surface 100S2 of the display panel 100, the second cover surface 200S2 of the cover panel 200, and the main circuit board 400.

The fingerprint sensor 310 may detect a fingerprint. The fingerprint sensor 310 may be located in the opening portion 200OP. The fingerprint sensor 310 may be received in the opening portion 200OP. The fingerprint sensor 310 may be accommodated inside the opening portion 200OP. The fingerprint sensor 310 may be located in the opening portion 200OP and may be attached to the second surface 100S2 of the display panel 100.

A size of the fingerprint sensor 310 may be equal to or less than a size of the opening portion 200OP. A size of the fingerprint sensor 310 may be defined as a planar area of the fingerprint sensor 310. A size of the opening portion 200OP may be defined as a planar area of the opening portion 200OP. A width of the fingerprint sensor 310 in one direction may be equal to or less than a width of the opening portion 200OP in one direction. For example, a width of the fingerprint sensor 310 in the second direction (e.g., the y direction or the –y direction) may be equal to or less than a width of the opening portion 200OP in the second direction (e.g., the y direction or the –y direction).

In an embodiment, the fingerprint sensor 310 may include an optical fingerprint sensor that detects incident light using an optical sensor. In another embodiment, the fingerprint sensor 310 may include an ultrasonic fingerprint sensor that detects a vibration using a piezoelectric material. In another embodiment, the fingerprint sensor 310 may include a capacitive fingerprint sensor that detects a change in capacitance of a capacitor formed between a plurality of electrodes. In another embodiment, the fingerprint sensor 310 may detect a fingerprint using one or more fingerprint sensing methods.

The sensing circuit board 330 may be connected to the fingerprint sensor 310. In an embodiment, the sensing circuit board 330 may be mechanically and/or electrically connected to the fingerprint sensor 310. For example, the sensing circuit board 330 and the fingerprint sensor 310 may be electrically connected to each other through an anisotropic conductive film. In another embodiment, the sensing circuit board 330 and the fingerprint sensor 310 may be adhered to each other through any of various materials such as a non-conductive film (NCF) or a resin. The sensing circuit board 330 may extend from the fingerprint sensor 310 to a side of the opening portion 200OP (Here, the side may correspond to a portion of an inner surface of the opening portion 200OP).

The sensing circuit board 330 may extend from a side of the opening portion 200OP. In an embodiment the sensing circuit board 330 may extend from the side of the opening portion 200OP to the second cover surface 200S2 (e.g., the sensing circuit board 330 may extend from the side of the opening portion 200OP to a position of the second covering surface 200S2, and similar descriptions herein may be similar to this). The sensing circuit board 330 may not entirely surround the opening portion 200OP. If the sensing circuit board 330 entirely surrounds the opening portion 200OP, an area occupied by the sensing circuit board 330 on the second cover surface 200S2 may be undesirably large. Because the sensing circuit board 330 extends from a side of the opening portion 200OP to the second cover surface 200S2, an area occupied by the sensing circuit board 330 on the second cover surface 200S2 may be minimized.

The sensing circuit board 330 may include an edge. The edge may define a shape or structure of the sensing circuit board 330. In an embodiment, the sensing circuit board 330 may include a first edge 330E1 and a second edge 330E2 that are opposite each other. In an embodiment, the first edge 330E1 and the second edge 330E2 may extend from fingerprint sensor 310 to a side of the opening portion 200OP. the first edge 330E1 and the second edge 330E2 may extend from the side of the opening portion 200OP to the second cover surface 200S2. Each of the first edge 330E1 and the second edge 330E2 may have a linear/straight shape and/or a curved shape.

At least a part of the sensing circuit board 330 may overlap the main circuit board 400. The sensing circuit board 330 may be electrically connected to the main circuit board 400. In an embodiment, the sensing circuit board 330 may be electrically connected to the main circuit board 400 through an anisotropic conductive film. In another embodiment, the sensing circuit board 330 may be electrically connected to the main circuit board 400 through a connector.

The sensing driving device 350 may be located on the sensing circuit board 330. The sensing driving device 350 may be electrically connected to the sensing circuit board 330 and may be electrically connected to the fingerprint sensor 310. The sensing driving device 350 may receive and process an electrical signal generated by a user's fingerprint from the fingerprint sensor 310.

The adhesive pattern 500 may be located between the cover panel 200 and the sensing circuit board 330. The adhesive pattern 500 may be located on the second cover surface 200S2 to fix at least a part of the sensing circuit board 330. The adhesive pattern 500 may be located adjacent to the opening portion 200OP. In an embodiment, the adhesive pattern 500 may be attached to the cover panel 200 and/or the sensing circuit board 330 by being pressed with a silicone pad or a roller.

Figure 7A:
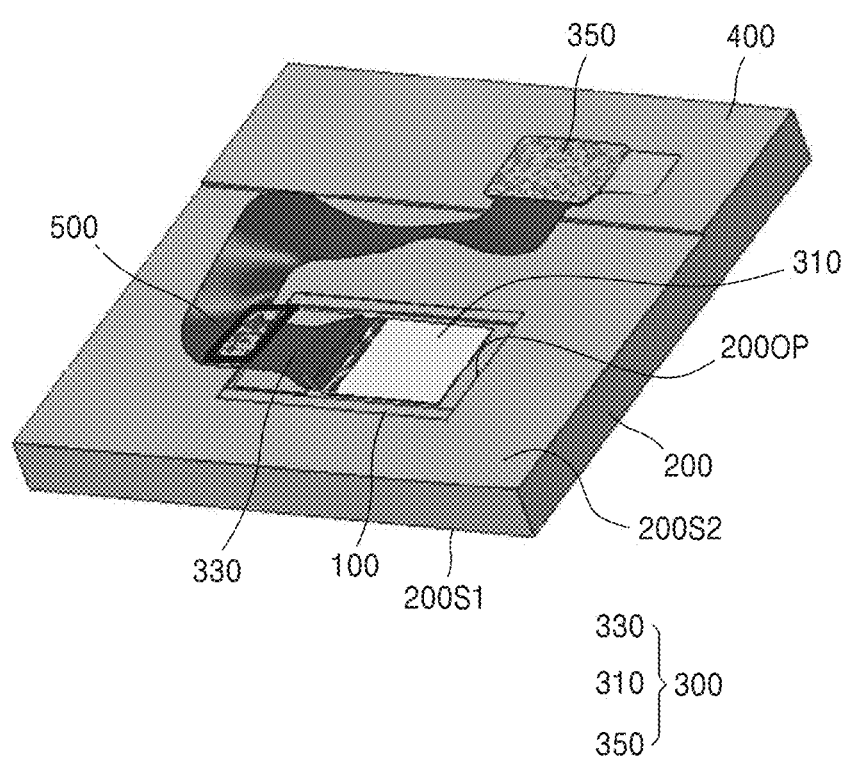
FIG. 7A is a view illustrating a simulation result when a fingerprint sensor assembly is assembled on a display panel and a main circuit board, according to an embodiment.

The adhesive pattern 500 may be located at a side of the opening portion 200OP (the adhesive pattern 500 may be positioned close to the side of the opening portion 200OP). When the fingerprint sensor assembly 300 is assembled or disposed in the display module DM, the sensing circuit board 330 may be at least partially deformed. For example, the sensing circuit board 330 may be at least partially lifted from the second cover surface 200S2 (e.g., as shown in FIG. 7A). When an element of an electronic device, for example, a set assembly, is assembled or placed on a rear surface of the display module DM, at least a part of the sensing circuit board 330 may be pressed by the set assembly, and the pressure may be substantially transmitted to the display panel 100. As a result, a stain or defect may be caused by the pressure on the display panel 100. Because the adhesive pattern 500 is located at a side of the opening portion 200OP, the pressure may be mitigated without being significantly transmitted to the display panel 100. Advantageously, a potentially visible stain may be prevented or reduced, and satisfactory image quality may be attained.

In an embodiment, the adhesive pattern 500 may be located only at a side of the opening portion 200OP. If the adhesive pattern 500 is continuously applied along the sensing circuit board 330, the fingerprint sensor assembly 300 may apply significant pressure to the main circuit board 400 when the fingerprint sensor assembly 300 is assembled or provided in the display module DM. Because the adhesive pattern 500 is located only at a side of the opening portion 200OP, the fingerprint sensor assembly 300 may not significantly apply pressure to the main circuit board 400.

The adhesive pattern 500 may have a width equal to or less than a distance between the first edge 330E1 and the second edge 330E2 (i.e., a width of the sensing circuit board 330). When the adhesive pattern 500 has a width greater than a distance between the first edge 330E1 and the second edge 330E2, the adhesive pattern 500 may be exposed to the outside. In this case, the adhesive pattern 500 may be contaminated, or the adhesive pattern 500 may be attached to other elements of the electronic device and/or the display apparatus. In the present embodiment, however, because the adhesive pattern 500 has a width equal to or less than a distance between the first edge 330E1 and the second edge 330E2, a phenomenon where the adhesive pattern 500 is contaminated or the adhesive pattern 500 is attached to other elements of the electronic device and/or the display apparatus may be prevented or reduced.

Each of FIG. 6A, FIG. 6B, FIG. 6C, and FIG. 6D illustrates a portion A of the display module DM of FIG. 5, according to an embodiment. In FIGS. 6A, 6B, 6C, and 6D, the same members as those in FIG. 5 are denoted by the same reference numerals, and thus a repeated description thereof will be omitted.

Referring to FIGS. 6A, 6B, 6C, and 6D, the display module DM may include the display panel 100, the cover panel 200, the fingerprint sensor assembly 300, the main circuit board 400, and the adhesive pattern 500. The cover panel 200 may be located on the second surface 100S2 of the display panel 100, and the opening portion 200OP may be defined in the cover panel 200 to overlap the second surface 100S2 of the display panel 100. The opening portion 200OP may be provided in the cover panel 200 and may expose the second surface 100S2 of the display panel 100. The fingerprint sensor assembly 300 may include the fingerprint sensor 310, the sensing circuit board 330, and the sensing driving device 350.

The fingerprint sensor 310 may be located in the opening portion 200OP. The sensing circuit board 330 may be connected to the fingerprint sensor 310 and may extend from a side of the opening portion 200OP. The sensing circuit board 330 extend from the opening portion 200OP in the x direction or the −x direction beyond the opening portion 200OP. Also, the sensing circuit board 330 may include the first edge 330E1 and the second edge 330E2 that are opposite each other. In an embodiment, the first edge 330E1 and the second edge 330E2 may extend from a side of the opening portion 200OP to the second cover surface 200S2.

The sensing circuit board 330 may include a first connection area 330CA1 (or first connection section), an overlapping area 330OA (or overlapping section), and a first area 330A1 (or first section). The first connection area 330CA1 may be an area overlapping the fingerprint sensor 310. The overlapping area 330OA may extend from the first connection area 330CA1 to a side of the opening portion 200OP. The overlapping area 330OA may extend from the side of the opening portion 200OP to the second cover surface 200S2 of the cover panel 200. In an embodiment, the overlapping area 330OA may at least partially overlap the adhesive pattern 500. Alternatively, the overlapping area 330OA may at least partially overlap the second cover surface 200S2. The first area 330A1 may extend from the overlapping area 330OA. In the first area 330A1, each of the first edge 330E1 and the second edge 330E2 may extend in a curved shape. In an embodiment, a curvature of the first edge 330E1 may be less than a curvature of the second edge 330E2. In this case, a center of curvature of the second edge 330E2 may be located outside the first area 330A1. In other words, in the first area 330A1, a center of curvature of the second edge 330E2 may not be located inside the first area 330A1.

The adhesive pattern 500 may be located between the cover panel 200 and the sensing circuit board 330. The adhesive pattern 500 may be located on the second cover surface 200S2 to fix at least a part of the sensing circuit board 330.

The adhesive pattern 500 may have a width 500w equal to or less than a distance d between the first edge 330E1 and the second edge 330E2. In an embodiment, the adhesive pattern 500 may have the width 500w that is equal to the distance d between the first edge 330E1 and the second edge 330E2. The distance d between the first edge 330E1 and the second edge 330E2 may be a distance between the first edge 330E1 and the second edge 330E2 in the second direction (e.g., the y direction or the −y direction). The width 500w of the adhesive pattern 500 may be a width of the adhesive pattern 500 in the second direction (e.g., the y direction or the −y direction).

Although the adhesive pattern 500 has a quadrangular shape in FIGS. 6A, 6B, 6C, and 6D, in another embodiment, the adhesive pattern 500 may have any of various shapes such as a curved shape.

Figure 6A:
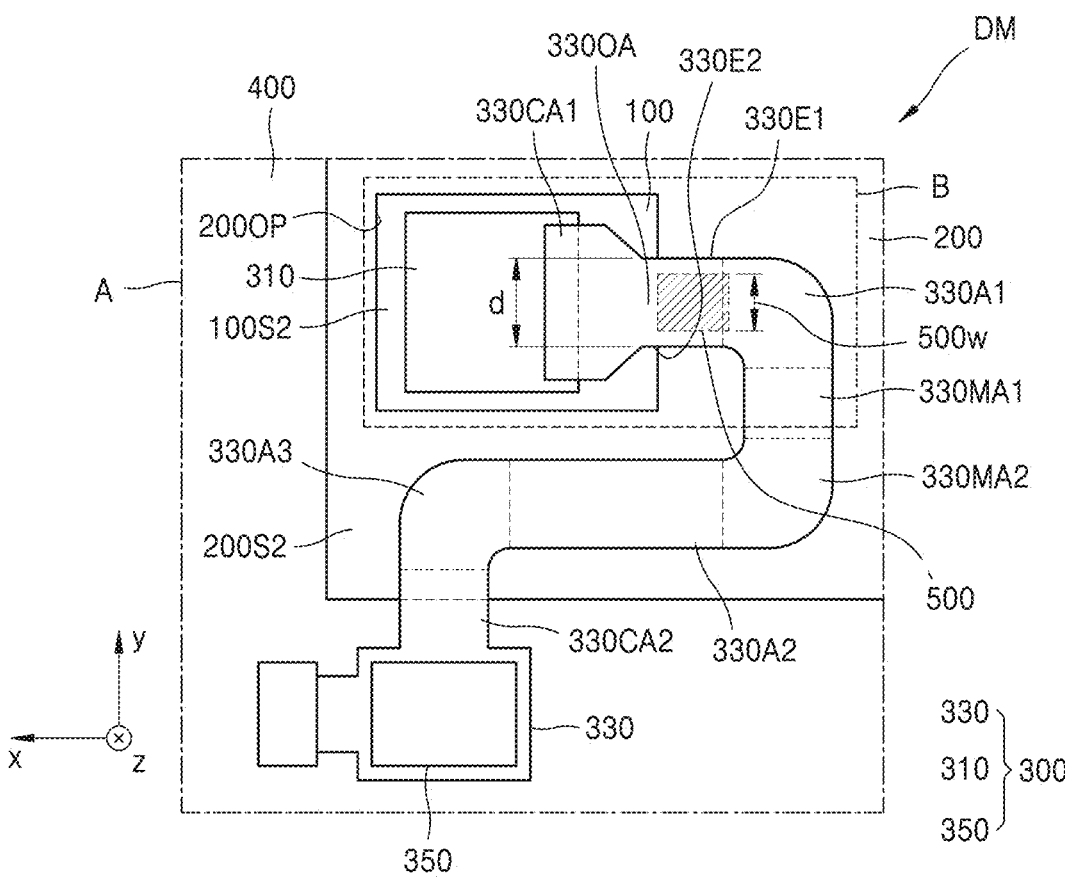
FIG. 6D illustrates a portion A of the display module of FIG. 5, according to an embodiment.

Referring to FIG. 6A, in a plan view, an edge of the adhesive pattern 500 may match an inner surface of the cover panel 200 in which the opening portion 200OP is defined. In other words, in a plan view, an edge of the adhesive pattern 500 may overlap an inner surface of the cover panel 200 in which the opening portion 200OP is defined.

Figure 6B:
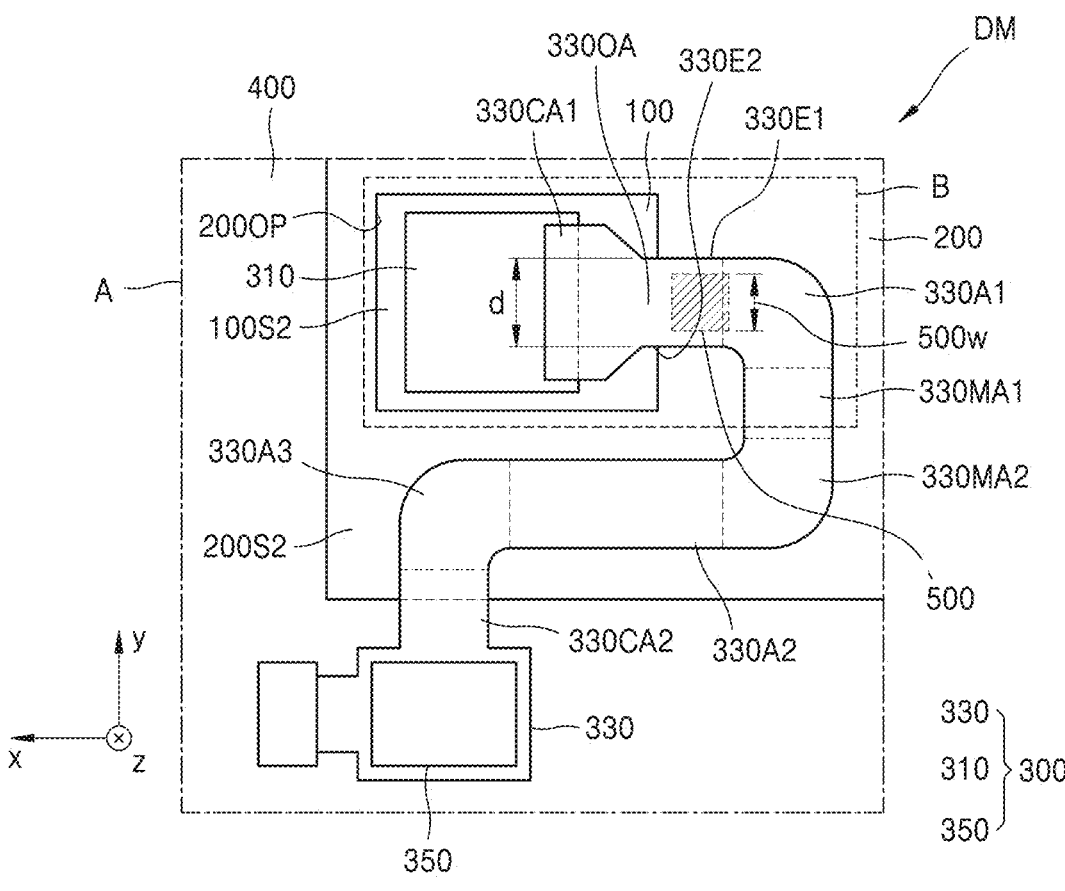

Referring to FIG. 6B, in a plan view, an edge of the adhesive pattern 500 may not match an inner surface of the cover panel 200 in which the opening portion 200OP is defined. In a plan view, an edge of the adhesive pattern 500 facing the opening portion 200OP may be located on the second cover surface 200S2.

Referring to FIGS. 6A and 6B, the sensing circuit board 330 may include the first connection area 330CA1 (or first connection section), the overlapping area 330OA (or overlapping section), the first area 330A1 (or first section), a first intermediate area 330MA1 (or first intermediate section), a second intermediate area 330MA2 (or second intermediate section), a second area 330A2 (or second section), a third area 330A3 (or third section), and a second connection area 330CA2 (second connection section).

The overlapping area 330OA may extend in one direction. For example, the overlapping area 330OA may extend in the first direction (e.g., the x direction or the −x direction). The overlapping area 330OA may extend beyond the opening portion 200OP in the first direction (e.g., the x direction or the −x direction).

The first area 330A1 may extend from the overlapping area 330OA. In the first area 330A1, each of the first edge 330E1 and the second edge 330E2 may extend in a curved shape. An extending direction of the first area 330A1 may gradually change from the first direction (e.g., the x direction or the −x direction) to the second direction (e.g., the y direction or the −y direction). For example, an extending direction of the first area 330A1 may gradually change from the −x direction to the −y direction.

The first intermediate area 330MA1 may extend from the first area 330A1 in one direction. For example, the first intermediate area 330MA1 may extend from the first area 330A1 in the second direction (e.g., the y direction or the –y direction).

The second intermediate area 330MA2 may extend from the first intermediate area 330MA1. In the second intermediate area 330MA2, each of the first edge 330E1 and the second edge 330E2 may extend in a curved shape. In an embodiment, a curvature of the first edge 330E1 may be less than a curvature of the second edge 330E2. Each of the first edge 330E1 and the second edge 330E2 may extend in a quadrant shape. In this case, a center of curvature of the second edge 330E2 may be located outside the second intermediate area 330MA2. In other words, in the second intermediate area 330MA2, a center of curvature of the second edge 330E2 may not be located inside the second intermediate area 330MA2. In an embodiment, an extending direction in the second intermediate area 330MA2 may gradually change from the second direction (e.g., the y direction or the –y direction) to the first direction (e.g., the x direction or the –x direction). For example, an extending direction of the second intermediate area 330MA2 may gradually change from the –y direction to the x direction.

The second area 330A2 may extend from the second intermediate area 330MA2 in one direction. For example, the second area 330A2 may extend from the second intermediate area 330MA2 in the first direction (e.g., the x direction or the –x direction).

The third area 330A3 may extend from the second area 330A2. In the third area 330A3, each of the first edge 330E1 and the second edge 330E2 may extend in a curved shape. In an embodiment, a curvature of the first edge 330E1 may be greater than a curvature of the second edge 330E2. Each of the first edge 330E1 and the second edge 330E2 may extend in a quadrant shape. In this case, a center of curvature of the first edge 330E1 may be located outside the third area 330A3. In other words, in the third area 330A3, a center of curvature of the first edge 330E1 may not be located inside the third area 330A3. In an embodiment, an extending direction of the third area 330A3 may gradually change from the first direction (e.g., the x direction or the –x direction) to the second direction (e.g., the y direction or the –y direction). For example, an extending direction of the third area 330A3 may gradually change from the x direction to the –y direction.

The second connection area 330CA2 may extend from the third area 330A3. The second connection area 330CA2 may be connected to the main circuit board 400. The second connection area 330CA2 may overlap the main circuit board 400. In an embodiment, the sensing driving device 350 may be located in/on the second connection area 330CA2. In an embodiment, the first area 330A1, the first intermediate area 330MA1, the second intermediate area 330MA2, the second area 330A2, and the third area 330A3 may not overlap the main circuit board 400.

Figure 6C:
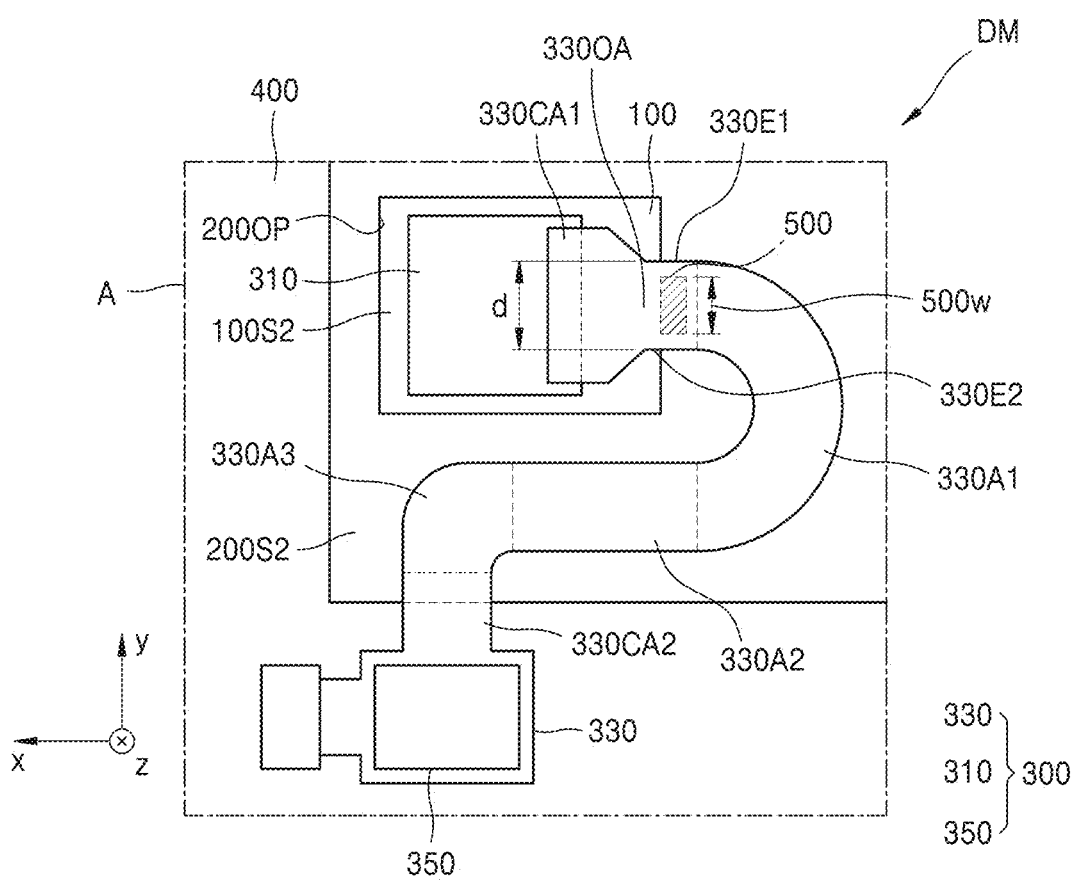

Referring to FIG. 6C, the sensing circuit board 330 may include a first connection area 330CA1, an overlapping area 330OA, a first area 330A1, a second area 330A2, a third area 330A3, and a second connection area 330CA2.

The overlapping area 330OA may extend in one direction. For example, the overlapping area 330OA may extend in the first direction (e.g., the x direction or the –x direction). The overlapping area 330OA may extend beyond the opening portion 200OP in the first direction (e.g., the x direction or the –x direction).

The first area 330A1 may extend from the overlapping area 330OA. In the first area 330A1, each of the first edge 330E1 and the second edge 330E2 may extend in a curved shape. In the first area 330A1, each of the first edge 330E1 and the second edge 330E2 may extend in a semicircular shape. In an embodiment, a curvature of the first edge 330E1 may be less than a curvature of the second edge 330E2. In this case, a center of curvature of the second edge 330E2 may be located outside the first area 330A1. In other words, in the first area 330A1, a center of curvature of the second edge 330E2 may not be located inside the first area 330A1. In the first area 330A1, the first edge 330E1 and the second edge 330E2 each extending in a semicircular shape may substantially prevent the sensing circuit board 330 from being distorted when the fingerprint sensor assembly 300 is assembled or provided in the display module DM. Also, the first edge 330E1 and the second edge 330E2 may prevent or reduce a visible stain potentially caused by pressure on the display panel 100.

The second area 330A2 may extend from the first area 330A1 in one direction. For example, the second area 330A2 may extend from the first area 330A1 in the first direction (e.g., the x direction or the –x direction).

The third area 330A3 may extend from the second area 330A2. In the third area 330A3, each of the first edge 330E1 and the second edge 330E2 may extend in a curved shape. In an embodiment, a curvature of the first edge 330E1 may be greater than a curvature of the second edge 330E2. Each of the first edge 330E1 and the second edge 330E2 may extend in a quadrant shape. In this case, a center of curvature of the first edge 330E1 may be located outside the third area 330A3. In other words, in the third area 330A3, a center of curvature of the first edge 330E1 may not be located inside the third area 330A3. In an embodiment, an extending direction of the third area 330A3 may gradually change from the first direction (e.g., the x direction or the –x direction) to the second direction (e.g., the y direction or the –y direction). For example, an extending direction of the third area 330A3 may gradually change from the x direction to the –y direction.

The second connection area 330CA2 may extend from the third area 330A3. The second connection area 330CA2 may be connected to the main circuit board 400. The second connection area 330CA2 may overlap the main circuit board 400. In an embodiment, the sensing driving device 350 may be located in/on the second connection area 330CA2. In an embodiment, the first area 330A1, the second area 330A2, and the third area 330A3 may not overlap the main circuit board 400.

Figure 6D:
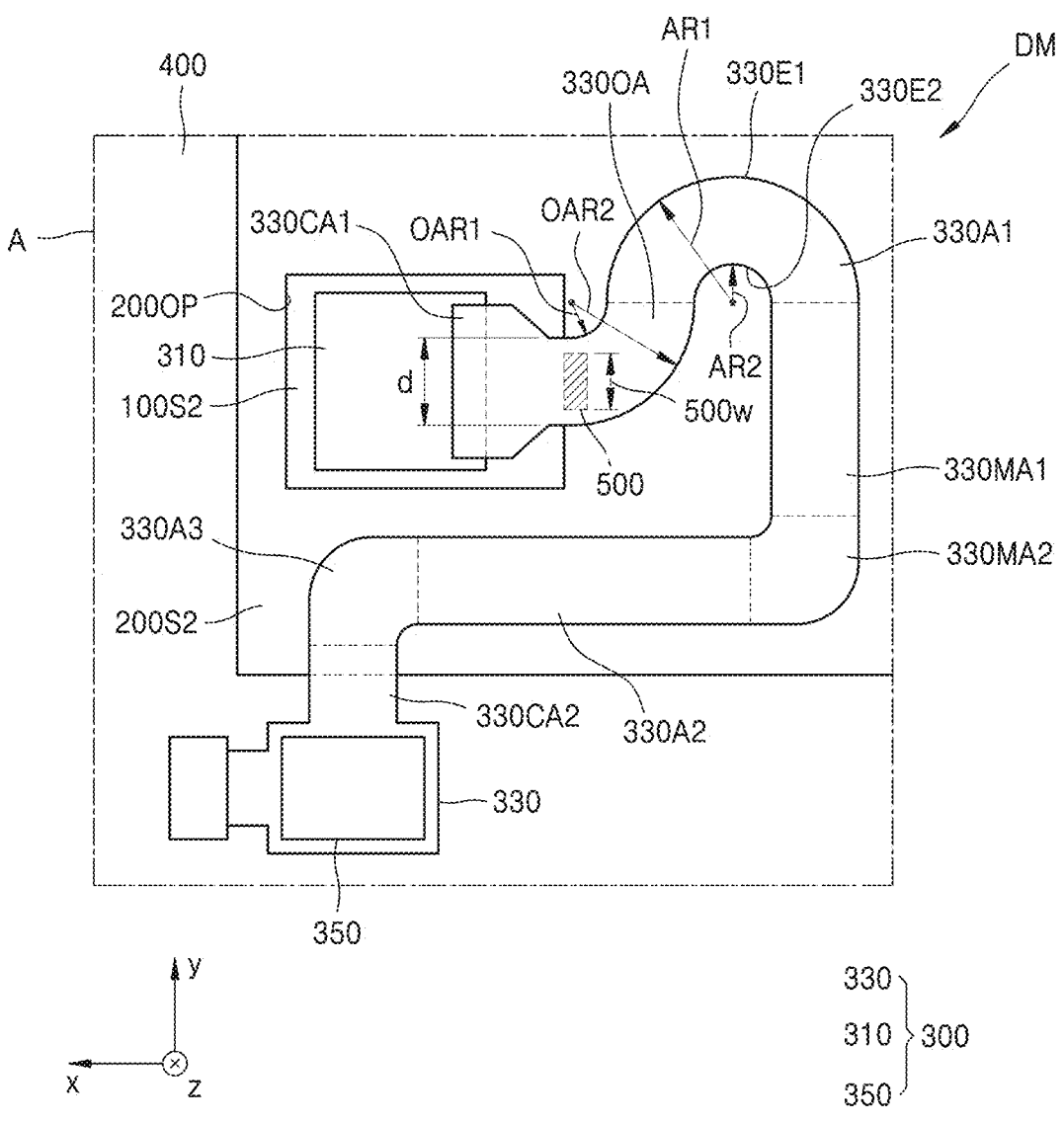

Referring to FIG. 6D, the sensing circuit board 330 may include a first connection area 330CA1, an overlapping area 330OA, a first area 330A1, a first intermediate area 330MA1, a second intermediate area 330MA2, a second area 330A2, the third area 330A3, and the second connection area 330CA2.

The overlapping area 330OA may extend from the first connection area 330CA1. In the overlapping area 330OA, each of the first edge 330E1 and the second edge 330E2 may extend in a curved shape. In an embodiment, in the overlapping area 330OA, a curvature of the first edge 330E1 may be greater than a curvature of the second edge 330E2. In the overlapping area 330OA, each of the first edge 330E1 and the second edge 330E2 may extend in a quadrant shape. In this case, in the overlapping area 330OA, a center of curvature of the first edge 330E1 may be located outside the overlapping area 330OA. In other words, in the overlapping area 330OA, a center of curvature of the first edge 330E1 may not be located inside the overlapping area 330OA. In an embodiment, a first radius of curvature OAR1 from a center of curvature of the first edge 330E1 to the first edge 330E1 in the overlapping area 330OA may be less than a second radius of curvature OAR2 from a center of curvature of the second edge 330E2 to the second edge 330E2 in the overlapping area 330OA. In an embodiment, an extending direction in the overlapping area 330OA may gradually change from the first direction (e.g., the x direction or the −x direction) to the second direction (e.g., the y direction or the −y direction). For example, an extending direction of the overlapping area 330OA may gradually change from the −x direction to the y direction.

The first area 330A1 may extend from the overlapping area 330OA. In the first area 330A1, each of the first edge 330E1 and the second edge 330E2 may extend in a curved shape. In an embodiment, in the first area 330A1, a curvature of the first edge 330E1 may be less than a curvature of the second edge 330E2. In the first area 330A1, each of the first edge 330E1 and the second edge 330E2 may extend in a semicircular shape. In this case, in the first area 330A1, a center of curvature of the second edge 330E2 may be located outside the first area 330A1. In other words, in the first area 330A1, a center of curvature of the second edge 330E2 may not be located inside the first area 330A1. In an embodiment, a first radius of curvature AR1 from a center of curvature of the first edge 330E1 to the first edge 330E1 in the first area 330A1 may be greater than a second radius of curvature AR2 from a center of curvature of the second edge 330E2 to the second edge 330E2 in the first area 330A1.

The first edge 330E1 and the second edge 330E2 each extending in a curved shape in the overlapping area 330OA and the first area 330A1 may substantially prevent the sensing circuit board 330 from being distorted when the fingerprint sensor assembly 300 is assembled or provided in the display module DM. Also, the first edge 330E1 and the second edge 330E2 may substantially prevent a visible stain potentially caused by pressure on the display panel 100.

The first intermediate area 330MA1 may extend from the first area 330A1 in one direction. For example, the first intermediate area 330MA1 may extend from the first area 330A1 in the second direction (e.g., the y direction or the −y direction).

The second intermediate area 330MA2 may extend from the first intermediate area 330MA1. In the second intermediate area 330MA2, each of the first edge 330E1 and the second edge 330E2 may extend in a curved shape. In an embodiment, a curvature of the first edge 330E1 may be less than a curvature of the second edge 330E2. Each of the first edge 330E1 and the second edge 330E2 may extend in a quadrant shape. In this case, a center of curvature of the second edge 330E2 may be located outside the second intermediate area 330MA2. In other words, in the second intermediate area 330MA2, a center of curvature of the second edge 330E2 may not be located inside the second intermediate area 330MA2. In an embodiment, an extending direction in the second intermediate area 330MA2 may gradually change from the second direction (e.g., the y direction or the −y direction) to the first direction (e.g., the x direction or the −x direction). For example, an extending direction of the second intermediate area 330MA2 may gradually change from the −y direction to the x direction.

The second area 330A2 may extend from the second intermediate area 330MA2 in one direction. For example, the second area 330A2 may extend from the second intermediate area 330MA2 in the first direction (e.g., the x direction or the −x direction).

The third area 330A3 may extend from the second area 330A2. In the third area 330A3, each of the first edge 330E1 and the second edge 330E2 may extend in a curved shape.

In an embodiment, a curvature of the first edge 330E1 may be greater than a curvature of the second edge 330E2. Each of the first edge 330E1 and the second edge 330E2 may extend in a quadrant shape. In this case, a center of curvature of the first edge 330E1 may be located outside the third area 330A3. In other words, in the third area 330A3, a center of curvature of the first edge 330E1 may not be located inside the third area 330A3. In an embodiment, an extending direction of the third area 330A3 may gradually change from the first direction (e.g., the x direction or the −x direction) to the second direction (e.g., the y direction or the −y direction). For example, an extending direction of the third area 330A3 may gradually change from the x direction to the −y direction.

The second connection area 330CA2 may extend from the third area 330A3. The second connection area 330CA2 may be connected to the main circuit board 400. The second connection area 330CA2 may overlap the main circuit board 400. In an embodiment, the sensing driving device 350 may be located in the second connection area 330CA2. In an embodiment, the first area 330A1, the second area 330A2, and the third area 330A3 may not overlap the main circuit board 400.

For convenience of explanation, the following description will focus on an embodiment of FIG. 6A.

Figure 7B:
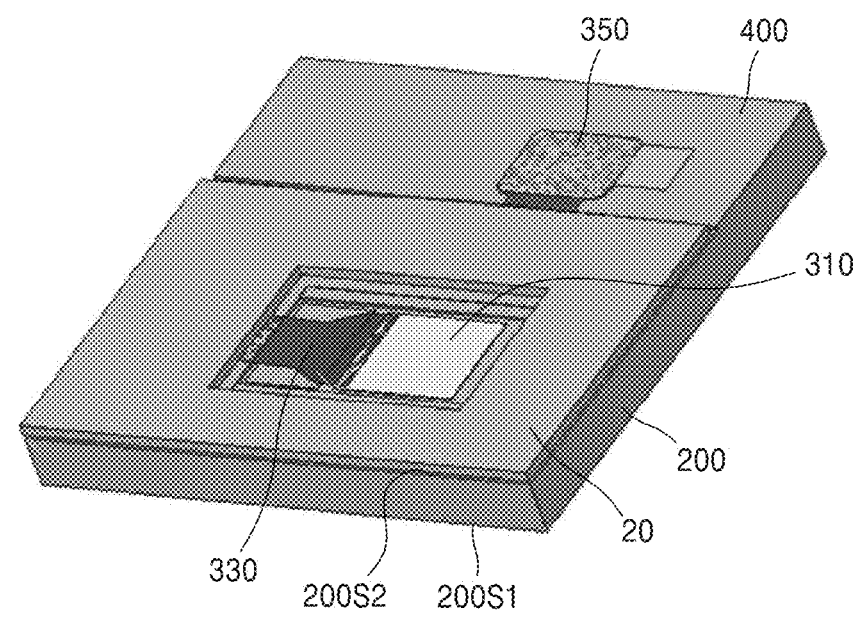
FIG. 7B is a view illustrating a simulation result when a set assembly is assembled on a fingerprint sensor assembly, according to an embodiment.
Figure 7C:
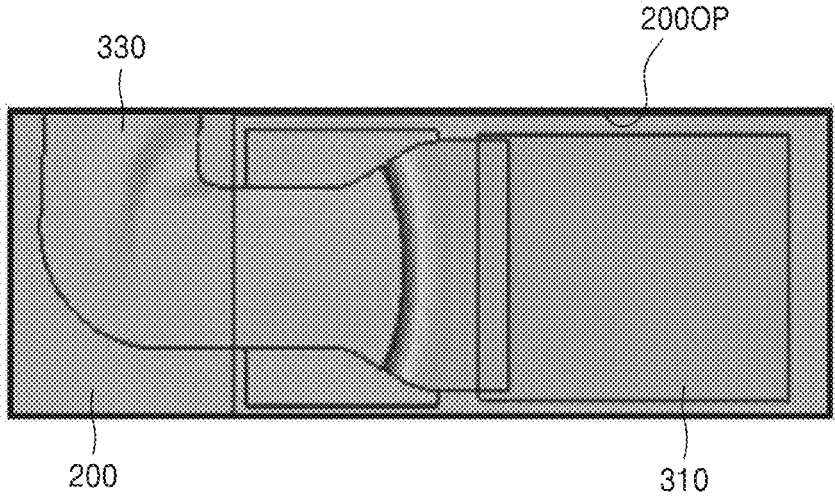
FIG. 7C is a view illustrating a simulation result showing parts of a fingerprint sensor and a sensing circuit board, according to an embodiment.

FIG. 7A is a view illustrating a simulation result when the fingerprint sensor assembly 300 is assembled on the display panel 100 and the main circuit board 400, according to an embodiment. FIG. 7B is a view illustrating a simulation result when the set assembly 20 is assembled on the fingerprint sensor assembly 300, according to an embodiment. FIG. 7C is a view illustrating a simulation result showing parts of the fingerprint sensor 310 and the sensing circuit board 330, according to an embodiment.

Referring to FIG. 7A, when the fingerprint sensor assembly 300 is assembled or provided on the display panel 100 and the main circuit board 400, the sensing circuit board 330 may be at least partially deformed. For example, at least a part of the sensing circuit board 330 may be lifted.

Referring to FIG. 7B, the set assembly 20 may be located behind a display apparatus. The deformed sensing circuit board 330 may be pressed by the set assembly 20. If the adhesive pattern 500 is omitted, the sensing circuit board 330 may be pressed by the set assembly 20, and stress may occur even in a part of the sensing circuit board 330 located in the opening portion 200OP. The sensing circuit board 330 located in the opening portion 200OP may directly or indirectly press the display panel 100, and a stain may be visible in an image displayed on the display panel 100.

When the adhesive pattern 500 is located between the cover panel 200 and the sensing circuit board 330, at least a part of the sensing circuit board 330 located on a side of the opening portion 200OP may be fixed. Referring to FIG. 7C, when the set assembly 20 is attached, a part of the sensing circuit board 330 located in the opening portion 200OP is not deformed. No deformation of the sensing circuit board 330 may be transmitted to a part of the sensing circuit board 330 located in the opening portion 200OP and the fingerprint sensor 310, and the pressure which potentially causes a stain on the display panel 100 may be prevented or reduced.

Each of FIG. 8A, FIG. 8B, FIG. 8C, and FIG. 8D illustrates a portion B of the display module DM of FIG. 6A, according to an embodiment. In FIGS. 8A, 8B, 8C, and 8D, the same members as those in FIG. 6A are denoted by the same reference numerals, and thus a repeated description thereof will be omitted.

Referring to FIGS. 8A, 8B, 8C, and 8D, the display module DM may include the display panel 100, the cover panel 200, a fingerprint sensor assembly 300, and the adhesive pattern 500. The cover panel 200 may be located on the second surface 100S2 of the display panel 100, and the opening portion 200OP may be defined in the cover panel 200 to overlap the second surface 100S2 of the display panel 100. The opening portion 200OP may be formed in the cover panel 200 and may expose the second surface 100S2 of the display panel 100. The fingerprint sensor assembly 300 may include the fingerprint sensor 310 and the sensing circuit board 330.

The fingerprint sensor 310 may be located in the opening portion 200OP. The sensing circuit board 330 may be connected to the fingerprint sensor 310, and may extend from a side of the opening portion 200OP. The sensing circuit board 330 may extend beyond the opening portion 200OP. The sensing circuit board 330 may include the first edge 330E1 and the second edge 330E2 that are opposite each other. In an embodiment, each of the first edge 330E1 and the second edge 330E2 may extend from a side of the opening portion 200OP to the second cover surface 200S2.

The sensing circuit board 330 may include the first connection area 330CA1, the overlapping area 330OA, and the first area 330A1. In an embodiment, the sensing circuit board 330 may include the first connection area 330CA1, the overlapping area 330OA, the first area 330A1, and the first intermediate area 330MA1. The first connection area 330CA1 may be an area overlapping the fingerprint sensor 310. The overlapping area 330OA may extend from the first connection area 330CA1 to a side of the opening portion 200OP. The overlapping area 330OA may extend from the side of the opening portion 200OP to the second cover surface 200S2 of the cover panel 200. In an embodiment, the overlapping area 330OA may at least partially overlap the adhesive pattern 500. Alternatively, the overlapping area 330OA may at least partially overlap the second cover surface 200S2. The first area 330A1 may extend from the overlapping area 330OA. In the first area 330A1, each of the first edge 330E1 and the second edge 330E2 may extend in a curved shape.

The adhesive pattern 500 may be located between the cover panel 200 and the sensing circuit board 330. The adhesive pattern 500 may be located on the second cover surface 200S2 to fix at least a part of the sensing circuit board 330. The adhesive pattern 500 may be located adjacent to the opening portion 200OP. In an embodiment, an edge of the adhesive pattern 500 may overlap an inner surface 200IS of the cover panel 200 in which the opening portion 200OP is defined. In other words, the edge of the adhesive pattern 500 may match the inner surface 200IS of the cover panel 200 in which the opening portion 200OP is defined.

The adhesive pattern 500 may have the width 500w equal to or less than the distance d between the first edge 330E1 and the second edge 330E2. In an embodiment, the adhesive pattern 500 may have the width 500w that is equal to the distance d between the first edge 330E1 and the second edge 330E2.

The adhesive pattern 500 may extend in an extending direction of the sensing circuit board 330. In an embodiment, the adhesive pattern 500 may extend from the inner surface 200IS of the cover panel 200 in which the opening portion 200OP is defined to the first area 330A1 of the sensing circuit board 330 (e.g., the adhesive pattern 500 may extend in the first area 330A1 of the sensing circuit board 330 from the inner surface 200IS of the cover panel 200 in which the opening portion 200OP is defined). In an embodiment, the adhesive pattern 500 may extend from the inner surface 200IS of the cover panel 200 to a portion of the sensing circuit board 330 where the first edge 330E1 or the second edge 330E2 starts to have a curved shape.

Figure 8A:
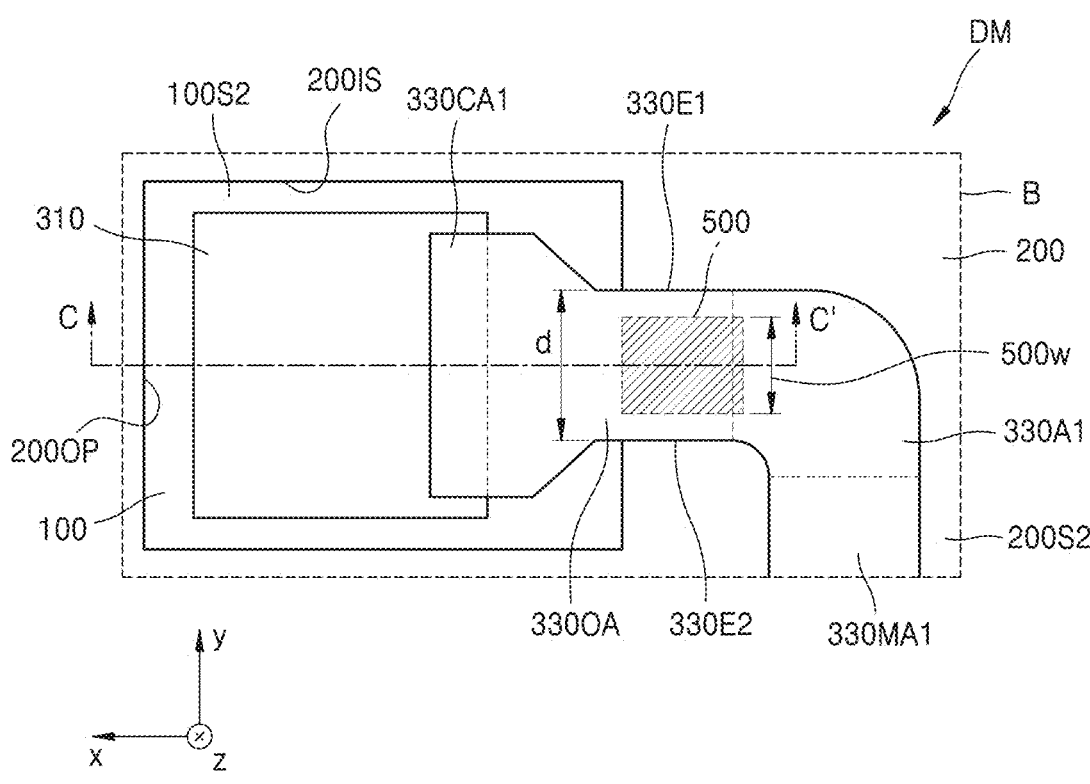
FIG. 8D illustrates a portion B of the display module of FIG. 6A, according to an embodiment.

Referring to FIG. 8A, each of the first edge 330E1 and the second edge 330E2 may extend from the first connection area 330CA1 to the overlapping area 330OA (e.g., each of the first edge 330E1 and the second edge 330E2 may extend in the overlapping area 330OA from the first connection area 330CA1, and similar descriptions herein may be similar to this). The first edge 330E1 and the second edge 330E2 may extend to be closer to each other. In an embodiment, each of the first edge 330E1 and the second edge 330E2 may be bent in the overlapping area 330OA. Accordingly, an area occupied by the sensing circuit board 330 on the second cover surface 200S2 may be minimized.

Figure 8B:
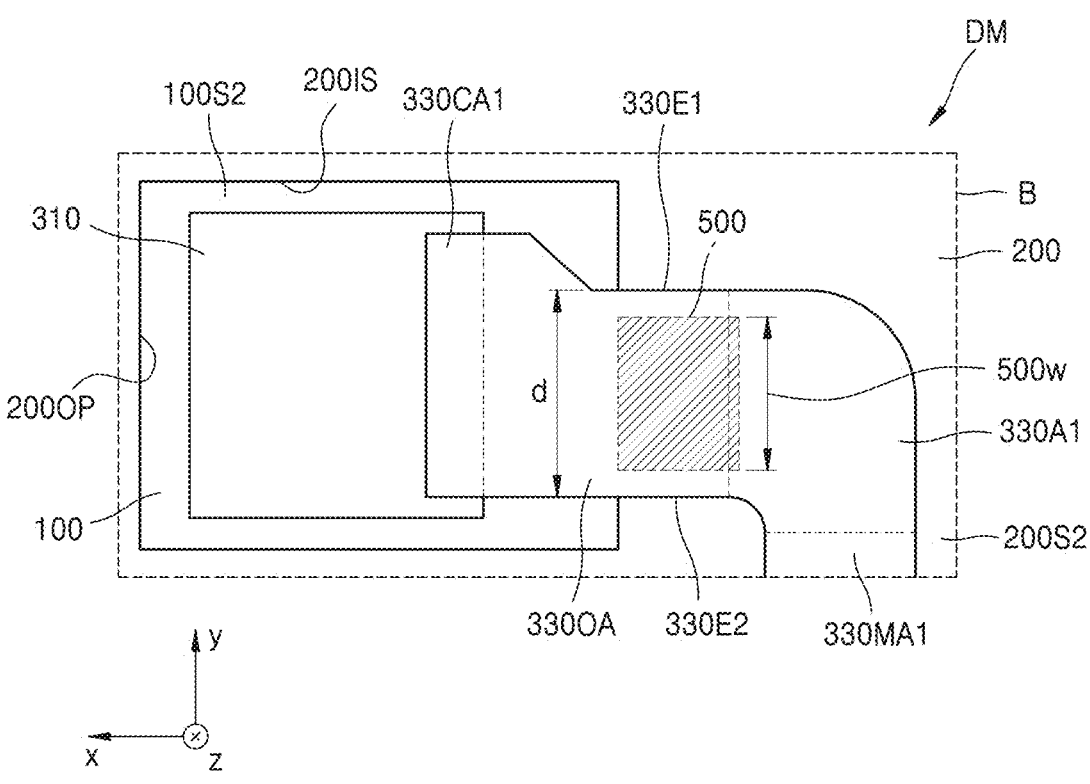
Figure 8C:
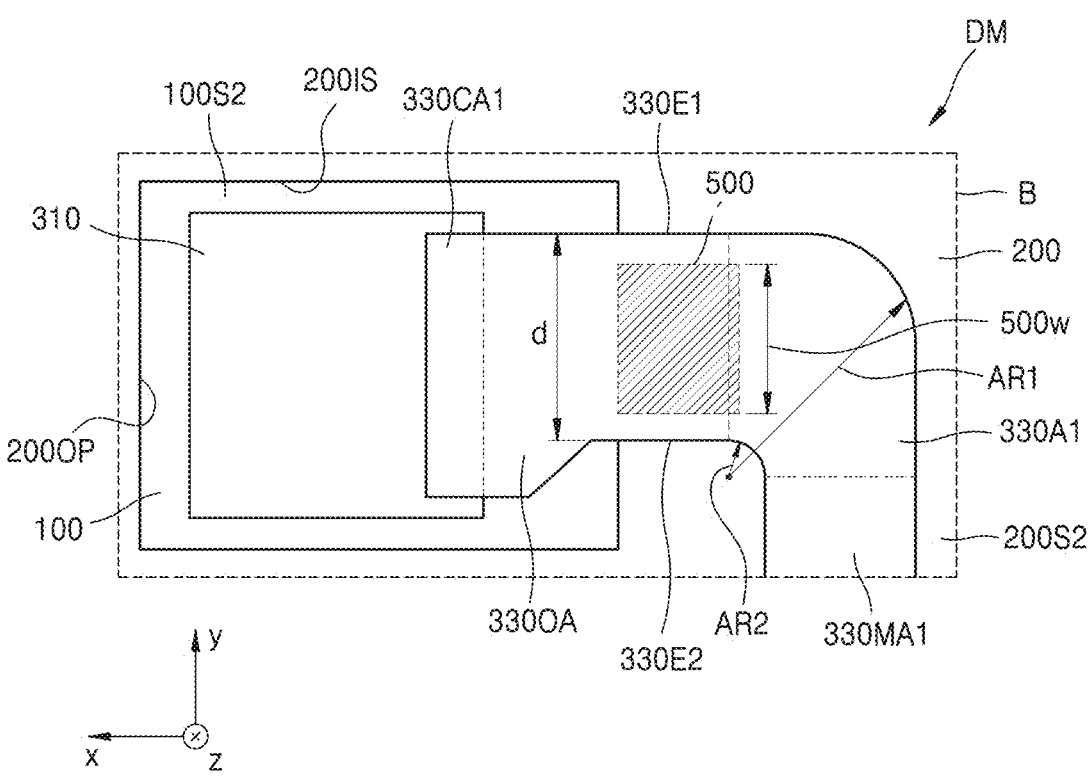
Figure 8D:
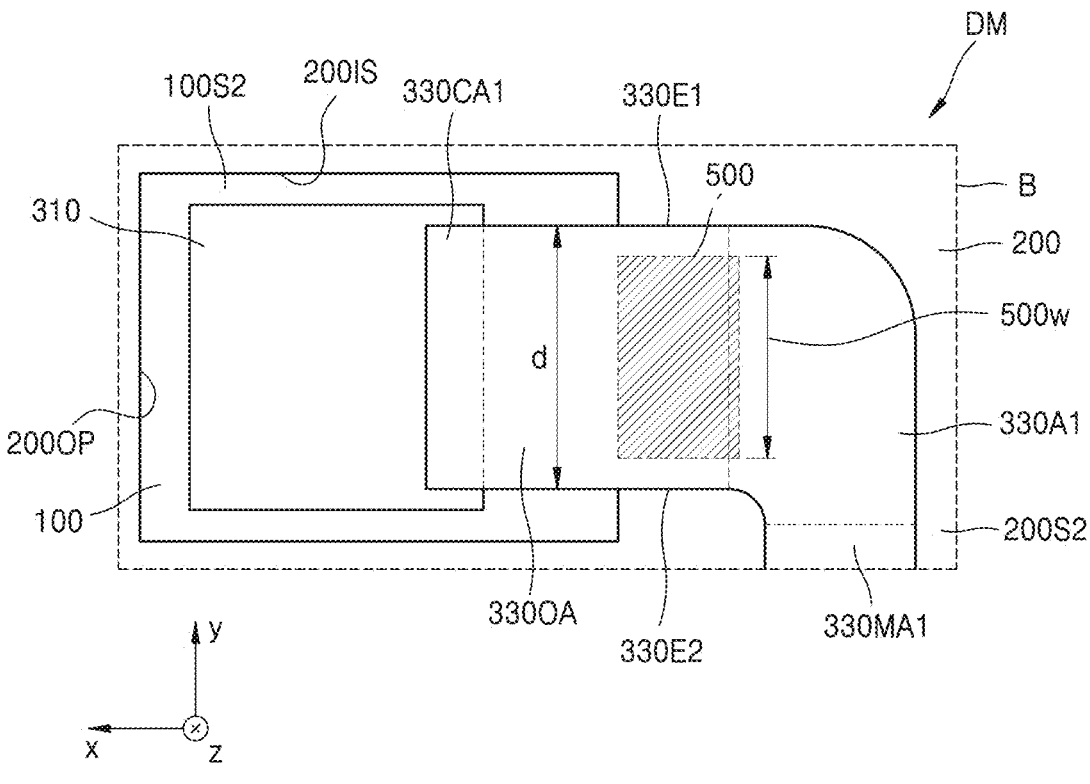

Referring to FIGS. 8B, 8C, and 8D, at least one of the first edge 330E1 and the second edge 330E2 may extend linearly from the first connection area 330CA1 to the overlapping area 330OA in one direction (e.g., at least one of the first edge 330E1 and the second edge 330E2 may extend linearly in the overlapping area 330OA from the first connection area 330CA1 in one direction, and similar descriptions herein may be similar to this). For example, at least one of the first edge 330E1 and the second edge 330E2 may extend from the first connection area 330CA1 to the overlapping area 330OA in the first direction (e.g., the x direction or the −x direction).

Referring to FIG. 8B, the second edge 330E2 may extend linearly from the first connection area 330CA1 to the overlapping area 330OA in one direction. For example, the second edge 330E2 may extend from the first connection area 330CA1 to the overlapping area 330OA in the first direction (e.g., the x direction or the −x direction). The second edge 330E2 may extend in the overlapping area 330OA in the first direction (e.g., the x direction or the −x direction).

At least a part of the first edge 330E1 may extend from the first connection area 330CA1 to the overlapping area 330OA to be closer to the second edge 330E2. In an embodiment, the first edge 330E1 may be bent to be closer to the second edge 330E2. At least a part of the first edge 330E1 may extend in the overlapping area 330OA to be closer to the second edge 330E2. In an embodiment, the first edge 330E1 may be bent in the overlapping area 330OA to be closer to the second edge 330E2.

Referring to FIG. 8C, the first edge 330E1 may extend linearly from the first connection area 330CA1 to the overlapping area 330OA in one direction. For example, the first edge 330E1 may extend from the first connection area 330CA1 to the overlapping area 330OA in the first direction (e.g., the x direction or the −x direction). The first edge 330E1 may extend in the overlapping area 330OA in the first direction (e.g., the x direction or the −x direction).

At least a part of the second edge 330E2 may extend from the first connection area 330CA1 to the overlapping area 330OA to be closer to the first edge 330E1. In an embodiment, the second edge 330E2 may be bent to be closer to the first edge 330E1. Also, in the first area 330A1, a center of curvature of the second edge 330E2 may be located outside the first area 330A1. In other words, in the first area 330A1, a center of curvature of the second edge 330E2 may not be located inside the first area 330A1. In an embodiment, the first radius of curvature AR1 from a center of curvature of the first edge 330E1 to the first edge 330E1 in the first area 330A1 may be greater than the second radius of curvature AR2 from a center of curvature of the second edge 330E2 to the second edge 330E2 in the first area 330A1. A visible stain potentially caused by pressure on the display panel 100 may be prevented or reduced.

Referring to FIG. 8D, each of the first edge 330E1 and the second edge 330E2 may extend from the first connection area 330CA1 to the overlapping area 330OA in one direction. For example, each of the first edge 330E1 and the second edge 330E2 may extend linearly from the first connection area 330CA1 to the overlapping area 330OA in the first direction (e.g., the x direction or the −x direction). A visible stain potentially caused by pressure on the display panel 100 may be prevented or reduced.

For convenience of explanation, the following description will focus on an embodiment of FIG. 8A.

Figure 9:
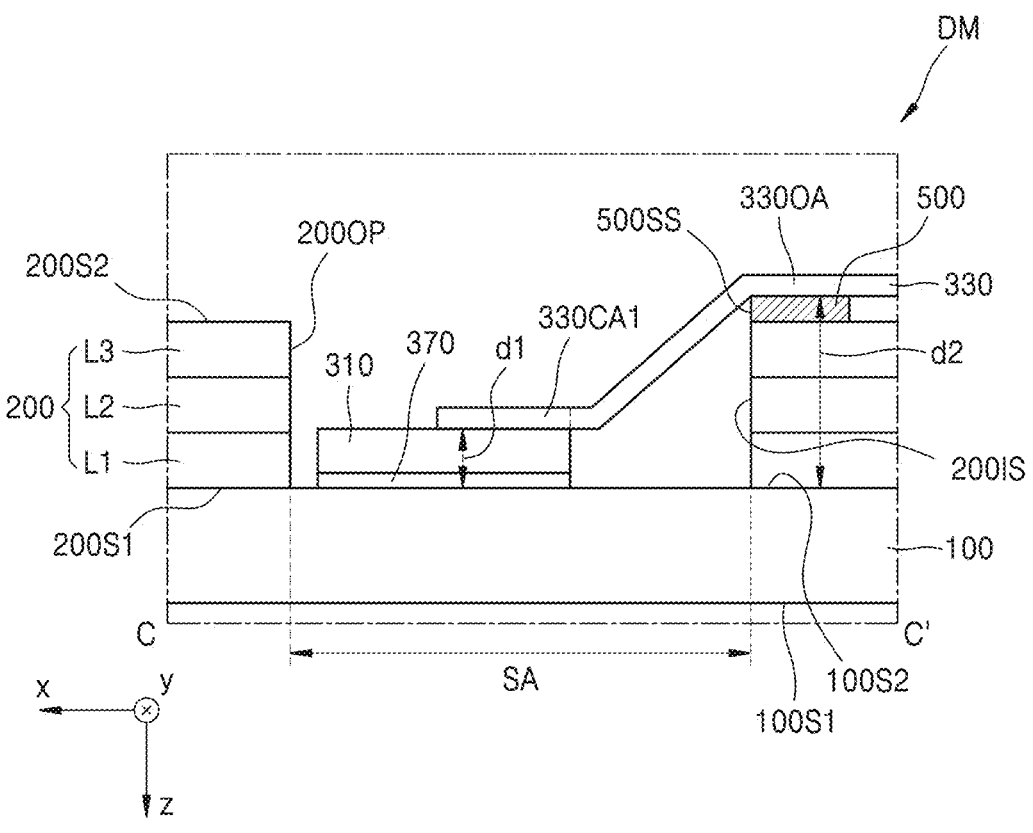
FIG. 9 is a cross-sectional view taken along a line C-C' of the display module of FIG. 8A, according to an embodiment.

FIG. 9 is a cross-sectional view taken along line C-C' of the display module DM of FIG. 8A, according to an embodiment. In FIG. 9, the same members as those in FIG. 8A are denoted by the same reference numerals, and thus a repeated description thereof will be omitted.

Referring to FIG. 9, the display module DM may include the display panel 100, the cover panel 200, a fingerprint sensor assembly 300, and the adhesive pattern 500. The display panel 100 may display an image. The display panel 100 may include the first surface 100S1 and the second surface 100S2. The second surface 100S2 may be a surface opposite the first surface 100S1.

The cover panel 200 may be located on the second surface 100S2 of the display panel 100. The cover panel 200 may include the first cover surface 200S1 and the second cover surface 200S2. The first cover surface 200S1 may be face the second surface 100S2 of the display panel 100. The second cover surface 200S2 may be a surface opposite the first cover surface 200S1.

The opening portion 200OP may be defined in the cover panel 200 to overlap the second surface 100S2 of the display panel 100. The opening portion 200OP may be formed in the cover panel 200 and may expose the second surface 100S2 of the display panel 100. The opening portion 200OP may pass through the first cover surface 200S1 and the second cover surface 200S2 of the cover panel 200. The opening portion 200OP may overlap with the sensing area SA of the display panel 100.

The opening portion 200OP may be defined by the inner surface 200IS of the cover panel 200. The inner surface 200IS of the cover panel 200 may be connected to the first cover surface 200S1 of the cover panel 200 and the second cover surface 200S2 of the cover panel 200.

The cover panel 200 may include a plurality of layers. For example, the cover panel 200 may include a first layer L1, a second layer L2, and a third layer L3. The first layer L1 may be a layer located closest to the second surface 100S2 of the display panel 100 from among the plurality of layers. In an embodiment, the first layer L1 may be a cushion layer. The first layer L1 may include a synthetic resin foam including a matrix member and a plurality of voids. The matrix member may include a flexible material. For example, the matrix member may include a synthetic resin. The plurality of voids may absorb an impact applied to the display panel 100. The plurality of voids may be distributed in the matrix member. The plurality of voids may cause a shape of the first layer L1 to be deformed. Accordingly, the first layer L1 may have sufficient elasticity.

The second layer L2 may be located on the first layer L1. In an embodiment, the second layer L2 may be located between the first layer L1 and the third layer L3. In an embodiment, the second layer L2 may be a heat-dissipating layer. For example, the second layer L2 may include a metal material having high thermal conductivity such as copper or aluminum.

The third layer L3 may be located on the second layer L2. The third layer L3 may be a layer located farthest from the display panel 100 from among the plurality of layers. In an embodiment, the third layer L3 may be a light-blocking layer. The third layer L3 may substantially prevent elements located on the second surface 100S2 of the display panel 100 are from being visible. The third layer L3 may be formed by coating a material such as carbon or chromium.

Although not shown in FIG. 9, an adhesive layer may be located between the display panel 100 and the first layer L1, between the first layer L1 and the second layer L2, and/or between the second layer L2 and the third layer L3. The adhesive layer may include a resin or an adhesive, or may be provided as a double-sided tape.

Although the cover panel 200 includes three layers in FIG. 9, the cover panel 200 may include one or more additional layers.

The fingerprint sensor assembly 300 may include the fingerprint sensor 310, the sensing circuit board 330, and a sensor adhesive layer 370. The fingerprint sensor 310 may be located in the opening portion 200OP. The sensor adhesive layer 370 may be located between the fingerprint sensor 310 and the display panel 100. The sensor adhesive layer 370 may include a resin or an adhesive, or may be a double-sided tape. In some embodiments, the sensor adhesive layer 370 may be located along a circumference of the fingerprint sensor 310 in a plan view.

The sensing circuit board 330 may be connected to the fingerprint sensor 310. The sensing circuit board 330 may include the first connection area 330CA1 and the overlapping area 330OA. The first connection area 330CA1 may be an area overlapping the fingerprint sensor 310. The overlapping area 330OA may extend from the first connection area 330CA1. The overlapping area 330OA may extend from a side of the opening portion 200OP to the second cover surface 200S2 of the cover panel 200. In an embodiment, the overlapping area 330OA may at least partially overlap the adhesive pattern 500. Alternatively, the overlapping area 330OA may at least partially overlap the second cover surface 200S2.

In the first connection area 330CA1, a first distance d1 between the display panel 100 and the sensing circuit board 330 may be less than a second distance d2 between the display panel 100 and the sensing circuit board 330 on the second cover surface 200S2. The first distance d1 may be a distance between the display panel 100 and the sensing circuit board 330 in the first connection area 330CA1 in the third direction (e.g., the z direction or the −z direction). The second distance d2 may be a distance between the display panel 100 and the sensing circuit board 330 on the second cover surface 200S2 in the third direction (e.g., the z direction or the −z direction).

The adhesive pattern 500 may be located between the cover panel 200 and the sensing circuit board 330. The adhesive pattern 500 may be located on the second cover surface 200S2 to fix at least a part of the sensing circuit board 330. The adhesive pattern 500 may include a resin or an adhesive, or may be a double-sided tape. The adhesive pattern 500 may be optional.

A side surface 500SS of the adhesive pattern 500 that is an edge of the adhesive pattern 500 may be directly connected to the inner surface 200IS of the cover panel 200. In other words, the side surface 500SS of the adhesive pattern 500 may match the inner surface 200IS of the cover panel

200. That is, the adhesive pattern 500 may be located immediately adjacent to the opening portion 200OP of the cover panel 200. In this case, even when the second distance d2 is greater than the first distance d1, a visible stain potentially caused by pressure on the display panel 100 visible may be prevented or reduced. However, a location of the adhesive pattern 500 may not be limited thereto. In some embodiments, the side surface 500SS of the adhesive pattern 500 may not match or be spaced from the inner surface 200IS of the cover panel 200.

In an embodiment, a thickness of the adhesive pattern 500 may be equal to or less than 0.2 mm. A thickness of the adhesive pattern 500 may be a distance between the cover panel 200 and the sensing circuit board 330 in the overlapping area 330OA in the third direction (e.g., the z direction or the −z direction). In another embodiment, a thickness of the adhesive pattern 500 may be greater than 0.2 mm.

Figure 10:
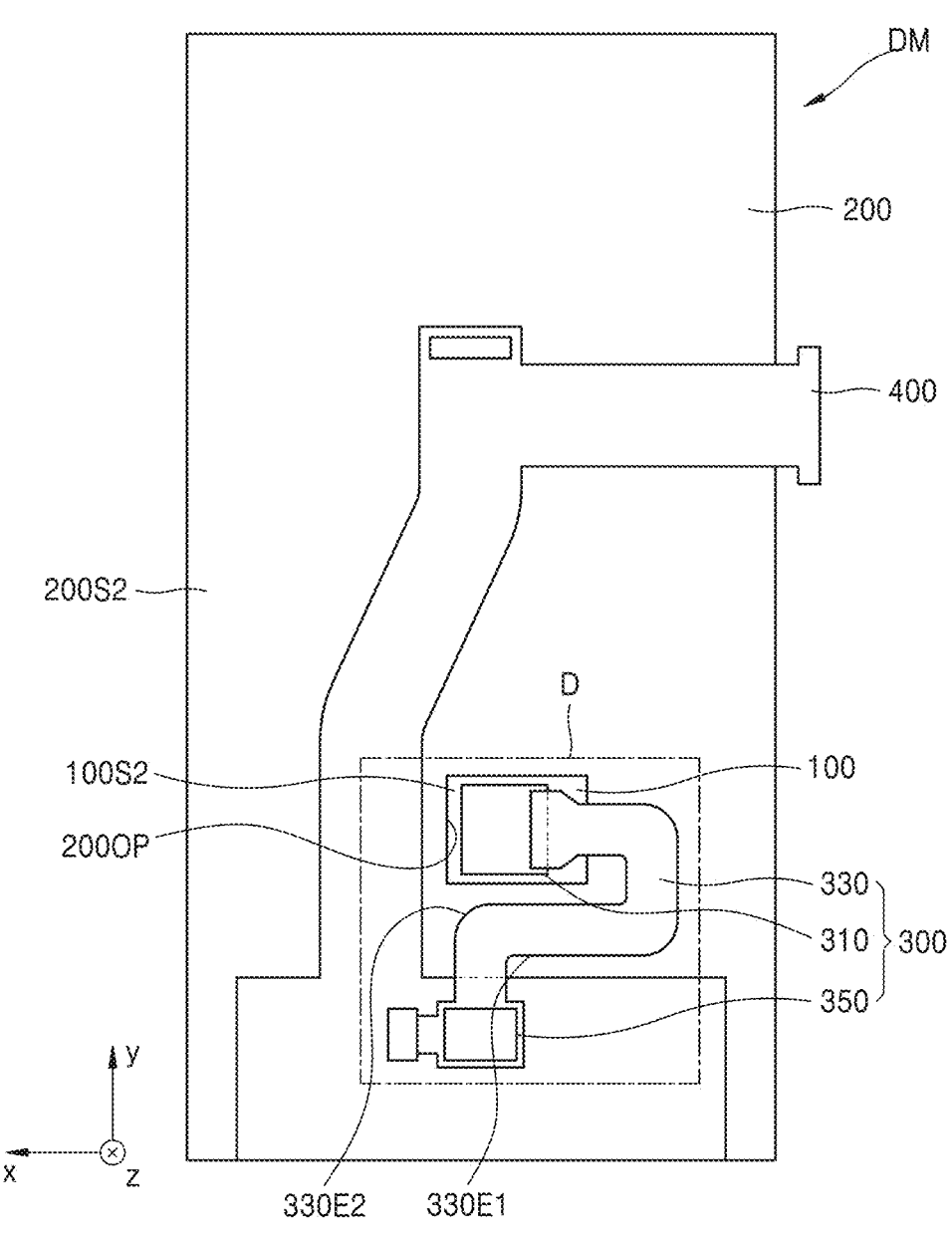
FIG. 10 is a plan view illustrating a rear surface of a display module, according to an embodiment.

FIG. 10 is a plan view illustrating a rear surface of the display module DM, according to an embodiment. In FIG. 10, the same members as those in FIG. 5 are denoted by the same reference numerals, and thus a repeated description thereof will be omitted.

Referring to FIG. 10, the display module DM may include the display panel 100, the cover panel 200, the fingerprint sensor assembly 300, and the main circuit board 400. The display module DM of FIG. 10 is different from the display module DM of FIG. 5 in that an adhesive pattern is omitted.

The display panel 100 may display an image. The display panel 100 may include a first surface and the second surface 100S2. The first surface may include an active area and a peripheral area. The second surface 100S2 may be a surface opposite the first surface.

The cover panel 200 may be located on the second surface 100S2 of the display panel 100. The cover panel 200 may include a first cover surface and the second cover surface 200S2. The first cover surface may face the second surface 100S2 of the display panel 100. The second cover surface 200S2 may be a surface opposite the first cover surface.

The opening portion 200OP may be defined in the cover panel 200 to overlap the second surface 100S2 of the display panel 100. The opening portion 200OP may pass through the first cover surface and the second cover surface 200S2 of the cover panel 200. The opening portion 200OP may expose at least a part of the second surface 100S2.

The cover panel 200 may include a plurality of layers. For example, the cover panel 200 may include a first layer, a second layer, and a third layer. The first layer, the second layer, and the third layer may be sequentially stacked, and the opening portion 200OP may pass through the first layer, the second layer, and the third layer. In an embodiment, the first layer may be a cushion layer. The second layer may be a heat-dissipating layer. The third layer may be a light-blocking layer. However, a structure of the cover panel 200 may not be limited thereto. Although the cover panel 200 includes the first layer, the second layer, and the third layer, the disclosure is not limited thereto and in another embodiment, the cover panel 200 may include one or more additional layers.

The fingerprint sensor assembly 300 may include the fingerprint sensor 310, the sensing circuit board 330, and the sensing driving device 350. The fingerprint sensor 310 may detect a fingerprint. The fingerprint sensor 310 may be located in the opening portion 200OP. The sensing circuit board 330 may be connected to the fingerprint sensor 310. In an embodiment, the sensing circuit board 330 may be electrically connected to the fingerprint sensor 310. The sensing circuit board 330 may extend from a side of the opening portion 200OP. Because the sensing circuit board 330 overlaps only one side of the opening portion 200OP, an area occupied by the sensing circuit board 330 on the second cover surface 200S2 may be minimized.

The sensing circuit board 330 may include an edge. The edge may define a shape or structure of the sensing circuit board 330. In an embodiment, the sensing circuit board 330 may include the first edge 330E1 and the second edge 330E2 that are opposite each other. In an embodiment, each of the first edge 330E1 and the second edge 330E2 may extend from a side of the opening portion 200OP to the second cover surface 200S2. Each of the first edge 330E1 and the second edge 330E2 may have a linear shape and/or a curved shape.

At least a part of the sensing circuit board 330 may overlap the main circuit board 400. The sensing circuit board 330 may be electrically connected to the main circuit board 400.

The sensing driving device 350 may be located on the sensing circuit board 330. The sensing driving device 350 may be electrically connected to the sensing circuit board 330, and may be electrically connected to the fingerprint sensor 310.

The main circuit board 400 may generate a signal for controlling an image or a power signal and may apply the signal to the display panel 100.

Figure 11A:
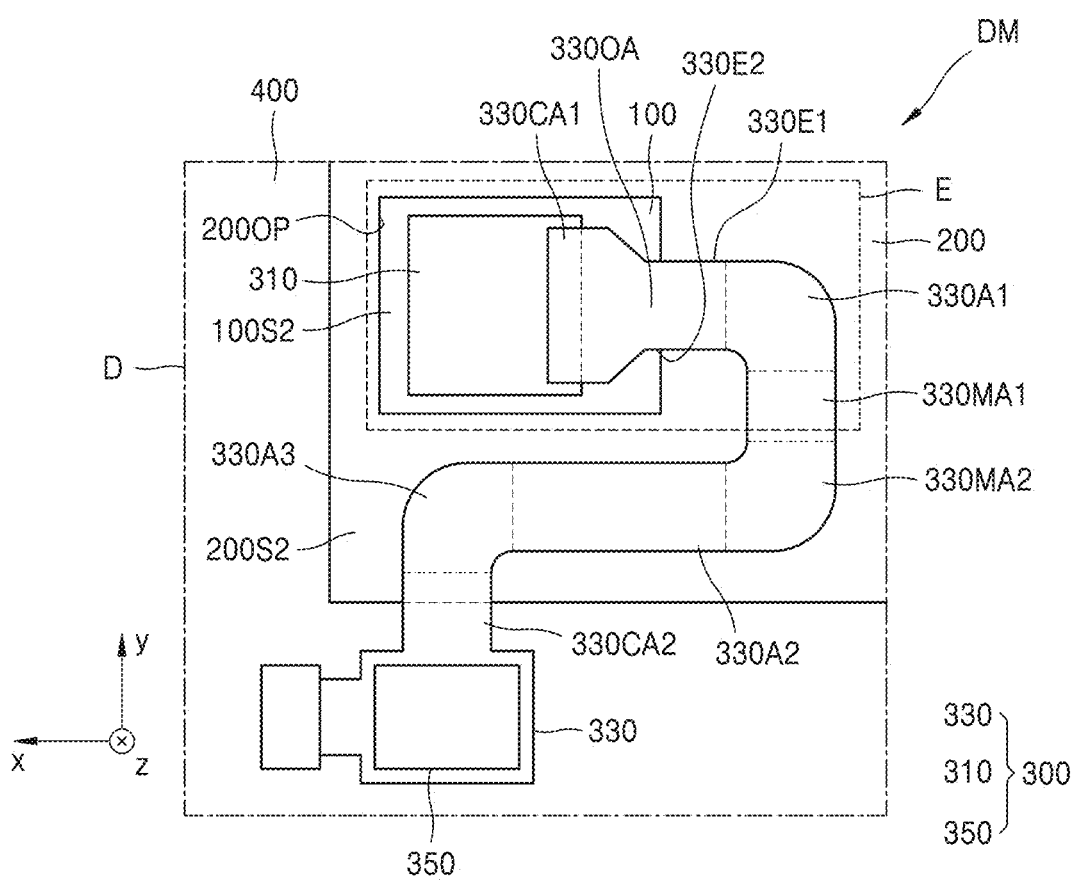
FIG. 11C illustrates a portion D of the display module of FIG. 10, according to an embodiment.
Figure 11B:
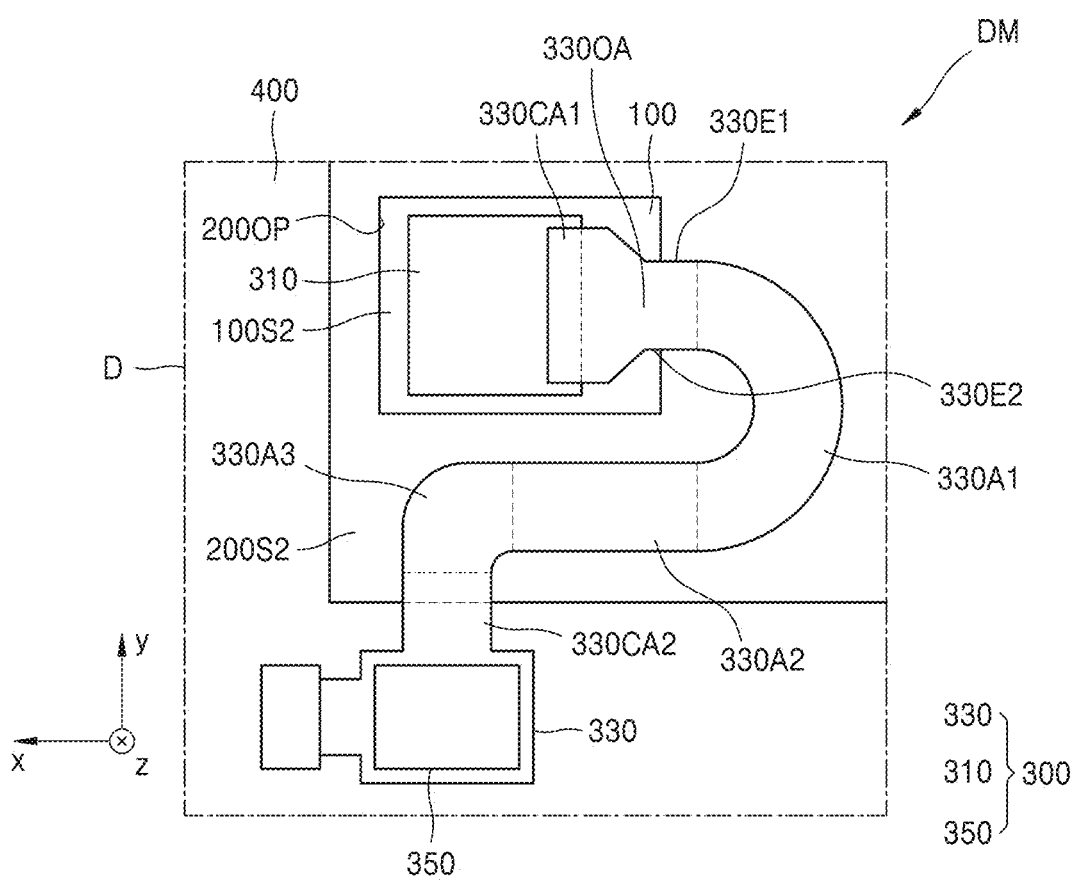
Figure 11C:
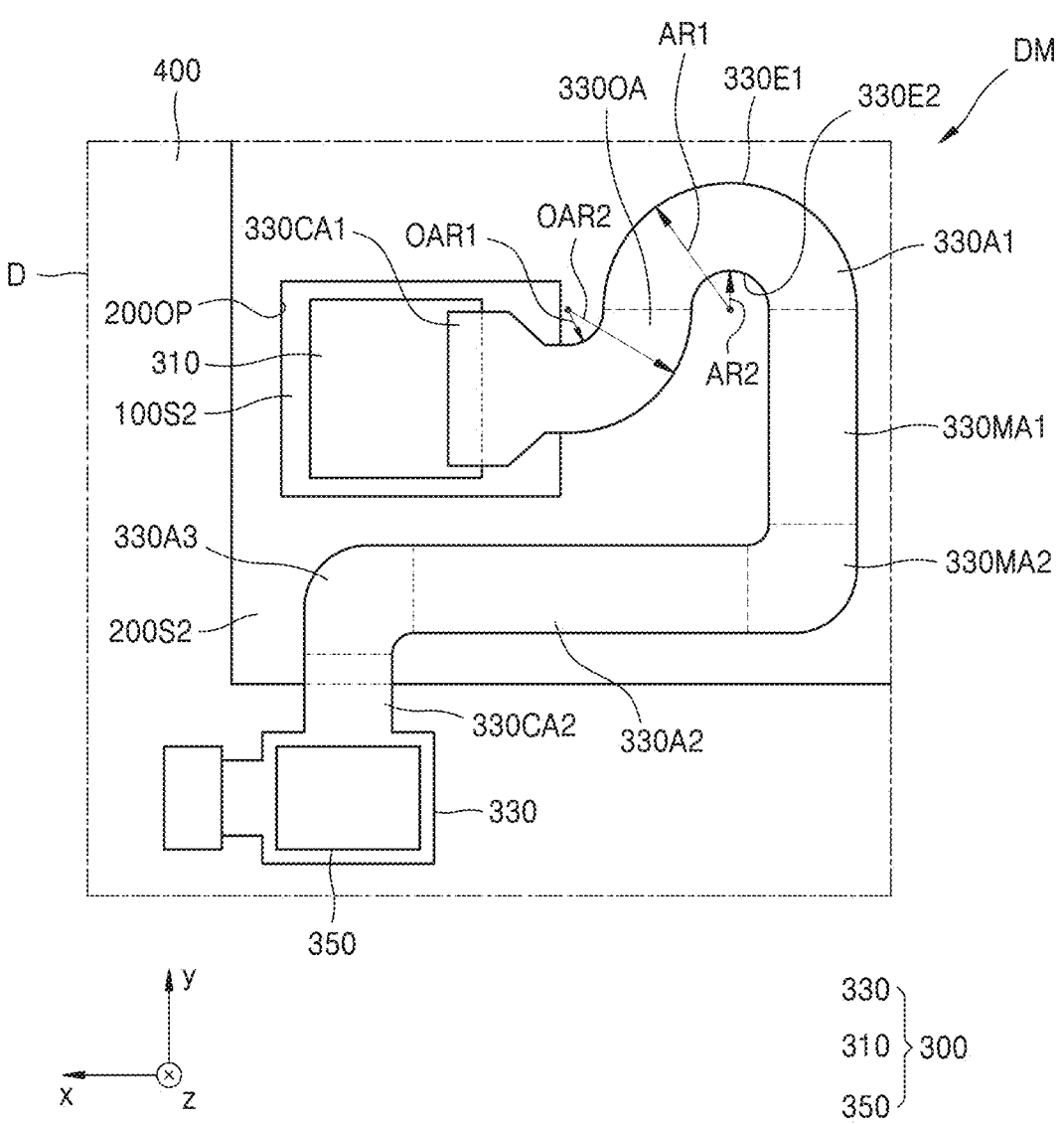

Each of FIG. 11A, FIG. 11B, and FIG. 11C illustrates a portion D of the display module DM of FIG. 10, according to an embodiment. In FIGS. 11A, 11B, and 11C, the same members as those in FIGS. 6A, 6B, and 6C are denoted by the same reference numerals, and thus a repeated description thereof will be omitted.

Referring to FIGS. 11A, 11B, and 11C, the display module DM may include the display panel 100, the cover panel 200, the fingerprint sensor assembly 300, and the main circuit board 400. The cover panel 200 may be located on the second surface 100S2 of the display panel 100, and the opening portion 200OP may be defined in the cover panel 200 to overlap the second surface 100S2 of the display panel 100. The opening portion 200OP may be formed in the cover panel 200 and may expose the second surface 100S2 of the display panel 100. The fingerprint sensor assembly 300 may include the fingerprint sensor 310, the sensing circuit board 330, and the sensing driving device 350.

The fingerprint sensor 310 may be located in the opening portion 200OP. The sensing circuit board 330 may be connected to the fingerprint sensor 310, and may extend from a side of the opening portion 200OP. The sensing circuit board 330 may extend beyond the opening portion 200OP. Also, the sensing circuit board 330 may include the first edge 330E1 and the second edge 330E2 that are opposite each other. In an embodiment, each of the first edge 330E1 and the second edge 330E2 may extend from a side of the opening portion 200OP to the second cover surface 200S2.

The sensing circuit board 330 may include the first connection area 330CA1, the overlapping area 330OA, and the first area 330A1. The first connection area 330CA1 may be an area overlapping the fingerprint sensor 310. The overlapping area 330OA may extend from the first connection area 330CA1 to a side of the opening portion 200OP. The overlapping area 330OA may extend from the side of the opening portion 200OP to the second cover surface 200S2 of the cover panel 200. In an embodiment, the overlapping area 330OA may at least partially overlap the second cover surface 200S2. The first area 330A1 may extend from the overlapping area 330OA. In the first area 330A1, each of the first edge 330E1 and the second edge 330E2 may extend in a curved shape. In an embodiment, a curvature of the first edge 330E1 may be less than a curvature of the second edge 330E2. In this case, a center of curvature of the second edge 330E2 may be located outside the first area 330A1. In other words, in the first area 330A1, a center of curvature of the second edge 330E2 may not be located inside the first area 330A1.

Referring to FIG. 11A, the sensing circuit board 330 may include the first connection area 330CA1, the overlapping area 330OA, the first area 330A1, the first intermediate area 330MA1, the second intermediate area 330MA2, the second area 330A2, the third area 330A3, and the second connection area 330CA2.

The overlapping area 330OA may extend in one direction. For example, the overlapping area 330OA may extend in the first direction (e.g., the x direction or the –x direction).

The first area 330A1 may extend from the overlapping area 330OA. In the first area 330A1, each of the first edge 330E1 and the second edge 330E2 may extend in a curved shape. An extending direction of the first area 330A1 may gradually change from the first direction (e.g., the x direction or the –x direction) to the second direction (e.g., the y direction or the –y direction). For example, an extending direction of the first area 330A1 may gradually change from the –x direction to the –y direction.

The first intermediate area 330MA1 may extend from the first area 330A1 in one direction. For example, the first intermediate area 330MA1 may extend from the first area 330A1 in the second direction (e.g., the y direction or the –y direction).

The second intermediate area 330MA2 may extend from the first intermediate area 330MA1. In the second intermediate area 330MA2, each of the first edge 330E1 and the second edge 330E2 may extend in a curved shape. In an embodiment, a curvature of the first edge 330E1 may be less than a curvature of the second edge 330E2. Each of the first edge 330E1 and the second edge 330E2 may extend in a quadrant shape. In this case, a center of curvature of the second edge 330E2 may be located outside the second intermediate area 330MA2. In other words, in the second intermediate area 330MA2, a center of curvature of the second edge 330E2 may not be located inside the second intermediate area 330MA2. In an embodiment, an extending direction of the second intermediate area 330MA2 may gradually change from the second direction (e.g., the y direction or the –y direction) to the first direction (e.g., the x direction or the –x direction). For example, an extending direction of the second intermediate area 330MA2 may gradually change from the –y direction to the x direction.

The second area 330A2 may extend from the second intermediate area 330MA2 in one direction. For example, the second area 330A2 may extend from the second intermediate area 330MA2 in the first direction (e.g., the x direction or the –x direction).

The third area 330A3 may extend from the second area 330A2. In the third area 330A3, each of the first edge 330E1 and the second edge 330E2 may extend in a curved shape. In an embodiment, a curvature of the first edge 330E1 may be greater than a curvature of the second edge 330E2. Each of the first edge 330E1 and the second edge 330E2 may extend in a quadrant shape. In this case, a center of curvature of the first edge 330E1 may be located outside the third area 330A3. In other words, in the third area 330A3, a center of curvature of the first edge 330E1 may not be located inside the third area 330A3. In an embodiment, an extending direction of the third area 330A3 may gradually change from the first direction (e.g., the x direction or the –x direction) to the second direction (e.g., the y direction or the –y direction). For example, an extending direction of the third area 330A3 may gradually change from the x direction to the –y direction.

The second connection area 330CA2 may extend from the third area 330A3. The second connection area 330CA2 may be connected to the main circuit board 400. The second connection area 330CA2 may overlap the main circuit board 400. In an embodiment, the sensing driving device 350 may be located in/on the second connection area 330CA2. In an embodiment, the first area 330A1, the first intermediate area 330MA1, the second intermediate area 330MA2, the second area 330A2, and the third area 330A3 may not overlap the main circuit board 400.

Referring to FIG. 11B, the sensing circuit board 330 may include the first connection area 330CA1, the overlapping area 330OA, the first area 330A1, the second area 330A2, the third area 330A3, and the second connection area 330CA2.

The overlapping area 330OA may extend in one direction. For example, the overlapping area 330OA may extend in the first direction (e.g., the x direction or the –x direction).

The first area 330A1 may extend from the overlapping area 330OA. In the first area 330A1, each of the first edge 330E1 and the second edge 330E2 may extend in a curved shape. In the first area 330A1, each of the first edge 330E1 and the second edge 330E2 may extend in a semicircular shape. In an embodiment, a curvature of the first edge 330E1 may be less than a curvature of the second edge 330E2. In this case, a center of curvature of the second edge 330E2 may be located outside the first area 330A1. In other words, in the first area 330A1, a center of curvature of the second edge 330E2 may not be located inside the first area 330A1. Accordingly, the first edge 330E1 and the second edge 330E2 each extending in a semicircular shape in the first area 330A1 may substantially prevent the sensing circuit board 330 from being distorted when the fingerprint sensor assembly 300 is assembled or provided in the display module DM. Also, the first edge 330E1 and the second edge 330E2 may prevent or reduce a phenomenon where a visible stain caused by pressure on the display panel 100.

The second area 330A2 may extend from the first area 330A1 in one direction. For example, the second area 330A2 may extend from first area 330A1 in the first direction (e.g., the x direction or the –x direction).

The third area 330A3 may extend from the second area 330A2. In the third area 330A3, each of the first edge 330E1 and the second edge 330E2 may extend in a curved shape. In an embodiment, a curvature of the first edge 330E1 may be greater than a curvature of the second edge 330E2. Each of the first edge 330E1 and the second edge 330E2 may extend in a quadrant shape. In this case, a center of curvature of the first edge 330E1 may be located outside the third area 330A3. In other words, in the third area 330A3, a center of curvature of the first edge 330E1 may not be located inside the third area 330A3. In an embodiment, an extending direction of the third area 330A3 may gradually change from the first direction (e.g., the x direction or the –x direction) to the second direction (e.g., the y direction or the –y direction). For example, an extending direction of the third area 330A3 may gradually change from the x direction to the –y direction.

The second connection area 330CA2 may extend from the third area 330A3. The second connection area 330CA2 may be connected to the main circuit board 400. The second connection area 330CA2 may overlap the main circuit board 400. In an embodiment, the sensing driving device 350 may be located in/on the second connection area 330CA2. In an embodiment, the first area 330A1, the second area 330A2, and the third area 330A3 may not overlap the main circuit board 400.

Referring to FIG. 11C, the sensing circuit board 330 may include the first connection area 330CA1, the overlapping area 330OA, the first area 330A1, the first intermediate area 330MA1, the second intermediate area 330MA2, the second area 330A2, the third area 330A3, and the second connection area 330CA2.

The overlapping area 330OA may extend from the first connection area 330CA1. In the overlapping area 330OA, each of the first edge 330E1 and the second edge 330E2 may extend in a curved shape. In an embodiment, in the overlapping area 330OA, a curvature of the first edge 330E1 may be greater than that of the second edge 330E2. In the overlapping area 330OA, each of the first edge 330E1 and the second edge 330E2 may extend in a quadrant shape. In this case, in the overlapping area 330OA, a center of curvature of the first edge 330E1 may be located outside the overlapping area 330OA. In other words, in the overlapping area 330OA, a center of curvature of the first edge 330E1 may not be located inside the overlapping area 330OA. In an embodiment, the first radius of curvature OAR1 from a center of curvature of the first edge 330E1 to the first edge 330E1 in the overlapping area 330OA may be less than the second radius of curvature OAR2 from a center of curvature of the second edge 330E2 to the second edge 330E2 in the overlapping area 330OA. In an embodiment, an extending direction in the overlapping area 330OA may gradually change from the first direction (e.g., the x direction or the –x direction) to the second direction (e.g., the y direction or the –y direction). For example, an extending direction of the overlapping area 330OA may gradually change from the –x direction to the y direction.

The first area 330A1 may extend from the overlapping area 330OA. In the first area 330A1, each of the first edge 330E1 and the second edge 330E2 may extend in a curved shape. In an embodiment, in the first area 330A1, a curvature of the first edge 330E1 may be less than a curvature of the second edge 330E2. In the first area 330A1, each of the first edge 330E1 and the second edge 330E2 may extend in a semicircular shape. In this case, in the first area 330A1, a center of curvature of the second edge 330E2 may be located outside the first area 330A1. In other words, in the first area 330A1, a center of curvature of the second edge 330E2 may not be located inside the first area 330A1. In an embodiment, the first radius of curvature AR1 from a center of curvature of the first edge 330E1 to the first edge 330E1 in the first area 330A1 may be greater than the second radius of curvature AR2 from a center of curvature of the second edge 330E2 to the second edge 330E2 in the first area 330A1.

The first edge 330E1 and the second edge 330E2 each extending in a curved shape in the overlapping area 330OA and the first area 330A1 may prevent or reduce a phenomenon where the sensing circuit board 330 is distorted when the fingerprint sensor assembly 300 is assembled in the display module DM. Also, the first edge 330E1 and the second edge 330E2 may prevent or reduce a visible stain potentially caused by pressure on the display panel 100.

The first intermediate area 330MA1 may extend from the first area 330A1 in one direction. For example, the first intermediate area 330MA1 may extend from the first area 330A1 in the second direction (e.g., the y direction or the –y direction).

The second intermediate area 330MA2 may extend from the first intermediate area 330MA1. In the second intermediate area 330MA2, each of the first edge 330E1 and the second edge 330E2 may extend in a curved shape. In an embodiment, a curvature of the first edge 330E1 may be less than a curvature of the second edge 330E2. Each of the first edge 330E1 and the second edge 330E2 may extend in a quadrant shape. In this case, a center of curvature of the second edge 330E2 may be located outside the second intermediate area 330MA2. In other words, in the second intermediate area 330MA2, a center of curvature of the second edge 330E2 may not be located inside the second intermediate area 330MA2. In an embodiment, an extending direction of the second intermediate area 330MA2 may gradually change from the second direction (e.g., the y direction or the –y direction) to the first direction (e.g., the x direction or the –x direction). For example, an extending direction of the second intermediate area 330MA2 may gradually change from the –y direction to the x direction.

The second area 330A2 may extend from the second intermediate area 330MA2 in one direction. For example, the second area 330A2 may extend from the second intermediate area 330MA2 in the first direction (e.g., the x direction or the –x direction).

The third area 330A3 may extend from the second area 330A2. In the third area 330A3, each of the first edge 330E1 and the second edge 330E2 may extend in a curved shape. In an embodiment, a curvature of the first edge 330E1 may be greater than a curvature of the second edge 330E2. Each of the first edge 330E1 and the second edge 330E2 may extend in a quadrant shape. In this case, a center of curvature of the first edge 330E1 may be located outside the third area 330A3. In other words, in the third area 330A3, a center of curvature of the first edge 330E1 may not be located inside the third area 330A3. In an embodiment, an extending direction of the third area 330A3 may gradually change from the first direction (e.g., the x direction or the –x direction) to the second direction (e.g., the y direction or the –y direction). For example, an extending direction of the third area 330A3 may gradually change from the x direction to the –y direction.

The second connection area 330CA2 may extend from the third area 330A3. The second connection area 330CA2 may be connected to the main circuit board 400. The second connection area 330CA2 may overlap the main circuit board 400. In an embodiment, the sensing driving device 350 may be located in/on the second connection area 330CA2. In an embodiment, the first area 330A1, the second area 330A2, and the third area 330A3 may not overlap the main circuit board 400.

For convenience of explanation, the following description will focus on an embodiment of FIG. 11A.

Figure 12:
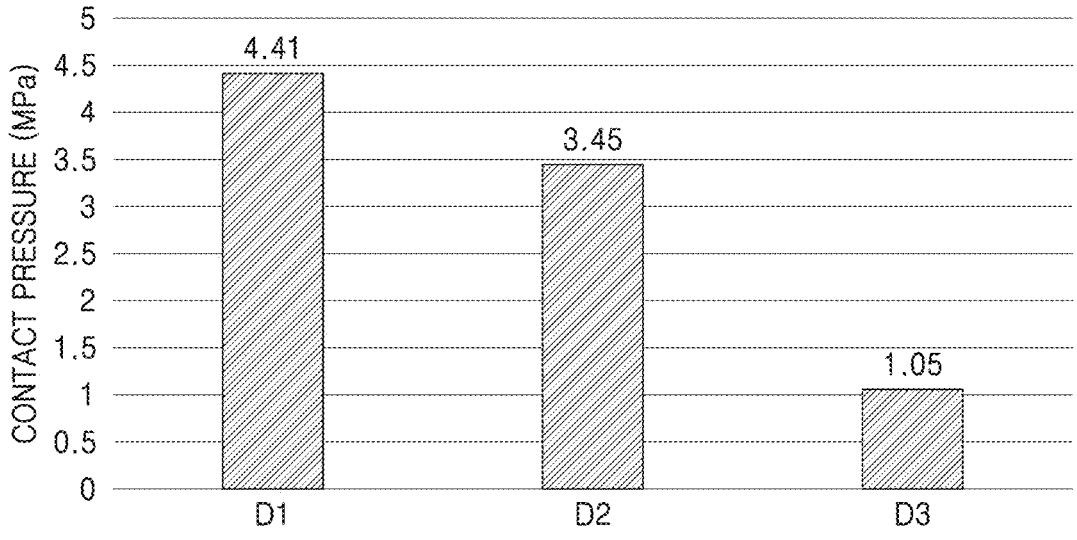
FIG. 12 is a graph showing simulation results of contact pressure applied to a display panel, according to various embodiments.

FIG. 12 is a graph showing simulation results of contact pressure applied to a display panel, according to various embodiments.

Referring to FIG. 12, D1 is a simulation result of contact pressure applied to a display panel described with reference to FIG. 11A. The contact pressure applied to the display panel described with reference to FIG. 11A was about 4.41 MPa.

D2 is a simulation result of contact pressure applied to a display panel described with reference to FIG. 11B. The contact pressure applied to the display panel described with reference to FIG. 11B was about 3.45 MPa. The contact pressure in the display panel described with reference to FIG. 11B is less than the contact pressure in the display panel described with reference to FIG. 11A. The contact pressure in the display panel described with reference to FIG. 11B is about 78% of the contact pressure in the display panel described with reference to FIG. 11A.

D3 is a simulation result of contact pressure applied to a display panel described with reference to FIG. 11C. The contact pressure applied to the display panel described with reference to FIG. 11C was about 1.05 MPa. The contact pressure in the display panel described with reference to FIG. 11C is less than the contact pressure in the display panel described with reference to FIG. 11A. The contact pressure in the display panel described with reference to FIG. 11C is about 23.8% of the contact pressure in the display panel described with reference to FIG. 11A.

Each of FIG. 13A, FIG. 13B, FIG. 13C, and FIG. 13D illustrates a portion E of the display module DM of FIG. 11A, according to an embodiment. In FIGS. 13A, 13B, 13C, and 13D, the same members as those in FIGS. 8A, 8B, 8C, and 8D are denoted by the same reference numerals, and thus a repeated description thereof will be omitted.

Referring to FIGS. 13A, 13B, 13C, and 13D, the display module DM may include the display panel 100, the cover panel 200, and a fingerprint sensor assembly 300. The cover panel 200 may be located on the second surface 100S2 of the display panel 100, and the opening portion 200OP may be defined in the cover panel 200 to overlap the second surface 100S2 of the display panel 100. The opening portion 200OP may be formed in the cover panel 200 and may expose the second surface 100S2 of the display panel 100. The fingerprint sensor assembly 300 may include the fingerprint sensor 310 and the sensing circuit board 330.

The fingerprint sensor 310 may be located in the opening portion 200OP. The sensing circuit board 330 may be connected to the fingerprint sensor 310, and may extend from a side of the opening portion 200OP. Also, the sensing circuit board 330 may include the first edge 330E1 and the second edge 330E2 that are opposite each other. In an embodiment, each of the first edge 330E1 and the second edge 330E2 may extend from a side of the opening portion 200OP to the second cover surface 200S2.

The sensing circuit board 330 may include the first connection area 330CA1, the overlapping area 330OA, and the first area 330A1. In an embodiment, the sensing circuit board 330 may include the first connection area 330CA1, the overlapping area 330OA, the first area 330A1, and the first intermediate area 330MA1. The first connection area 330CA1 may be an area overlapping the fingerprint sensor 310. The overlapping area 330OA may extend from the first connection area 330CA1 to a side of the opening portion 200OP. The overlapping area 330OA may extend from the side of the opening portion 200OP to the second cover surface 200S2 of the cover panel 200. In an embodiment, the overlapping area 330OA may at least partially overlap the second cover surface 200S2. The first area 330A1 may extend from the overlapping area 330OA. In the first area 330A1, each of the first edge 330E1 and the second edge 330E2 may extend in a curved shape.

Figure 13A:
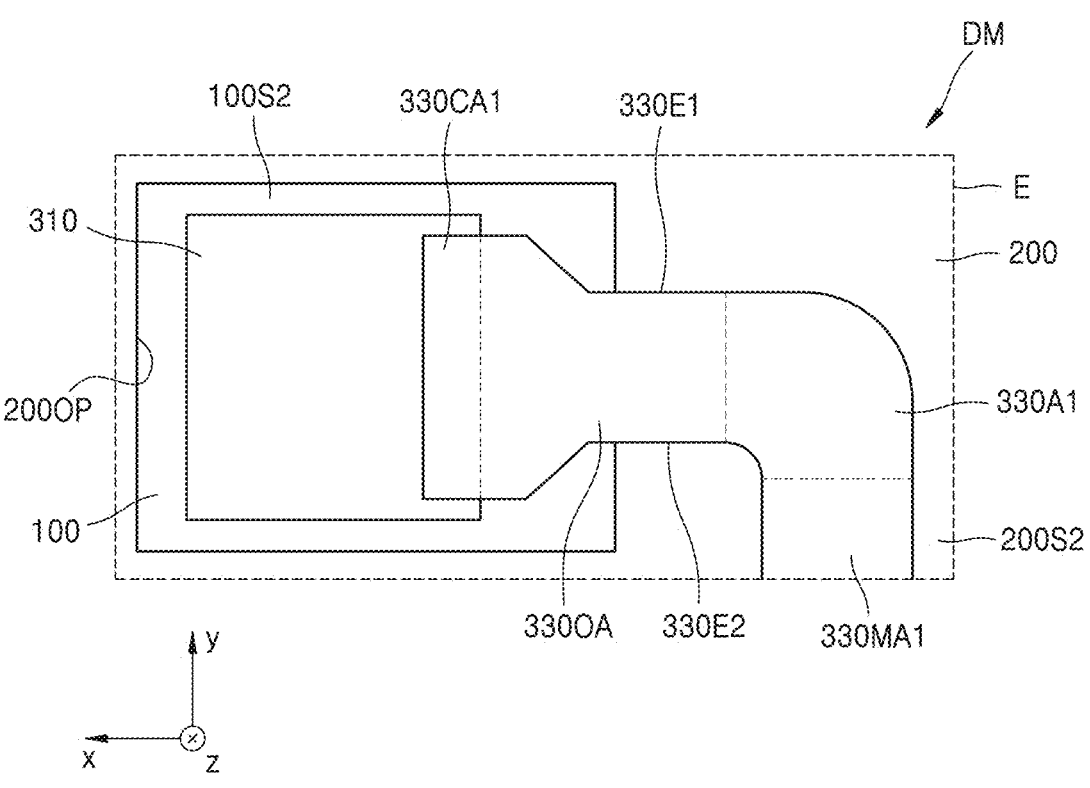
FIG. 13D illustrates a portion E of the display module of FIG. 11A, according to an embodiment.

Referring to FIG. 13A, each of the first edge 330E1 and the second edge 330E2 may extend from the first connection area 330CA1 to the overlapping area 330OA. The first edge 330E1 and the second edge 330E2 may extend to be closer to each other. In an embodiment, each of the first edge 330E1 and the second edge 330E2 may be bent in the overlapping area 330OA. Accordingly, an area occupied by the sensing circuit board 330 on the second cover surface 200S2 may be minimized.

Figure 13B:
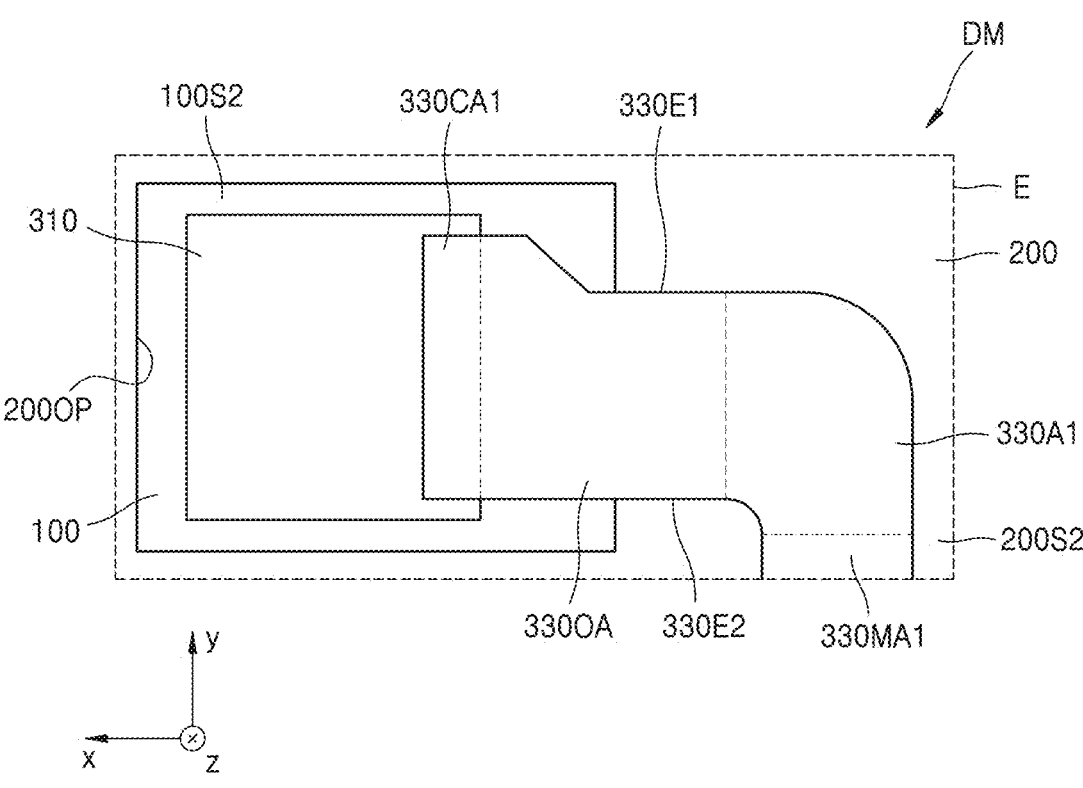
Figure 13C:
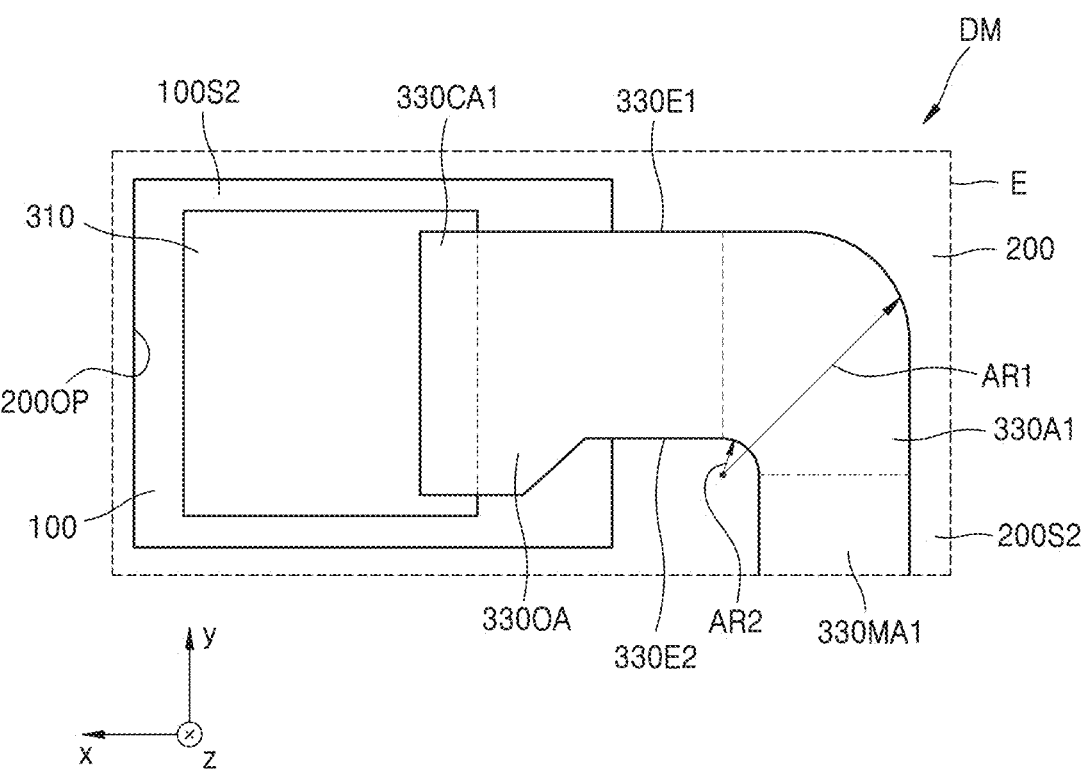
Figure 13D:
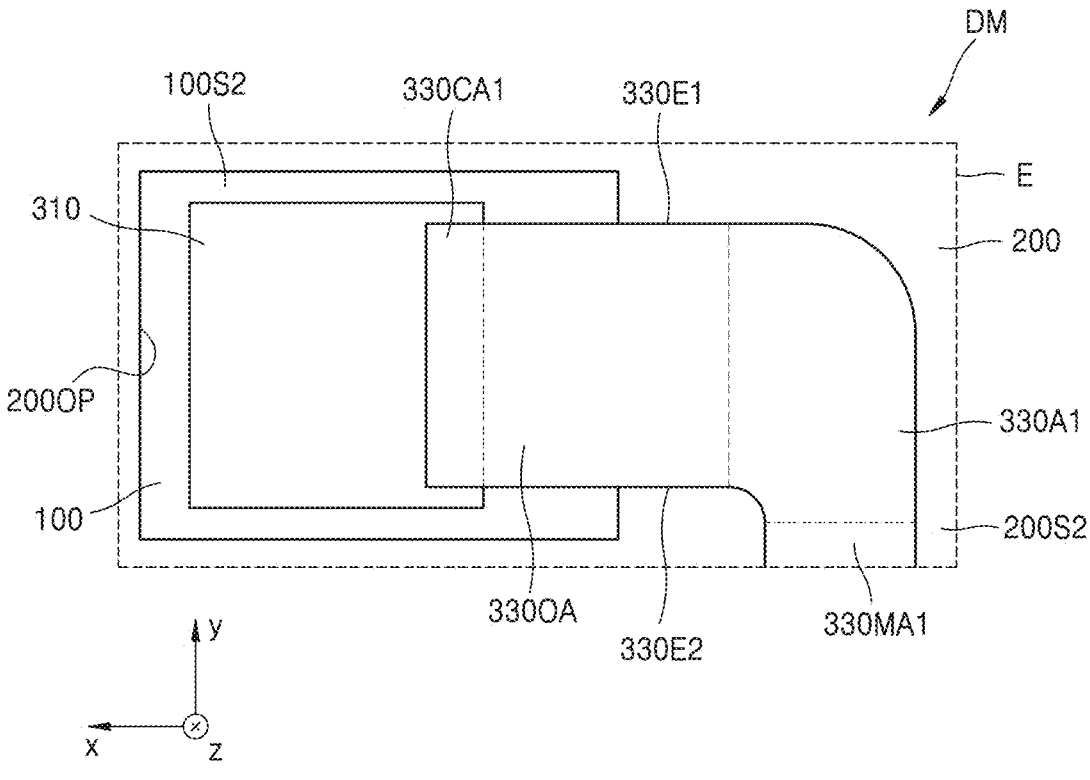

Referring to FIGS. 13B, 13C, and 13D, at least one of the first edge 330E1 and the second edge 330E2 may extend linearly from the first connection area 330CA1 to the overlapping area 330OA in one direction. For example, at least one of the first edge 330E1 and the second edge 330E2 may extend from the first connection area 330CA1 to the overlapping area 330OA in the first direction (e.g., the x direction or the −x direction).

Referring to FIG. 13B, the second edge 330E2 may extend from the first connection area 330CA1 to the overlapping area 330OA in one direction. For example, the second edge 330E2 may extend linearly from the first connection area 330CA1 to the overlapping area 330OA in the first direction (e.g., the x direction or the −x direction). The second edge 330E2 may extend in the overlapping area 330OA in the first direction (e.g., the x direction or the −x direction).

At least a part of the first edge 330E1 may extend from the first connection area 330CA1 to the overlapping area 330OA to be closer to the second edge 330E2. In an embodiment, the first edge 330E1 may be bent to be closer to the second edge 330E2. At least a part of the first edge 330E1 may extend in the overlapping area 330OA to be closer to the second edge 330E2. In an embodiment, the first edge 330E1 may be bent in the overlapping area 330OA to be closer to the second edge 330E2.

Referring to FIG. 13C, the first edge 330E1 may extend linearly from the first connection area 330CA1 to the overlapping area 330OA in one direction. For example, the first edge 330E1 may extend from the first connection area 330CA1 to the overlapping area 330OA in the first direction (e.g., the x direction or the −x direction). The first edge 330E1 may extend in the overlapping area 330OA in the first direction (e.g., the x direction or the −x direction).

At least a part of the second edge 330E2 may extend from the first connection area 330CA1 to the overlapping area 330OA to be closer to the first edge 330E1. In an embodiment, the second edge 330E2 may be bent to be closer to the first edge 330E1. At least a part of the second edge 330E2 may extend in the overlapping area 330OA to be closer to the first edge 330E1. In an embodiment, the second edge 330E2 may be bent in the overlapping area 330OA to be closer to the first edge 330E1. Also, in the first area 330A1, a center of curvature of the second edge 330E2 may be located outside the first area 330A1. In other words, in the first area 330A1, a center of curvature of the second edge 330E2 may not be located inside the first area 330A1. In an embodiment, the first radius of curvature AR1 from a center of curvature of the first edge 330E1 to the first edge 330E1 in the first area 330A1 may be greater than the second radius of curvature AR2 from a center of curvature of the second edge 330E2 to the second edge 330E2 in the first area 330A1. Advantageously, a visible stain potentially caused by pressure on the display panel 100 may be prevented or reduced.

Referring to FIG. 13D, each of the first edge 330E1 and the second edge 330E2 may extend linearly from the first connection area 330CA1 to the overlapping area 330OA in one direction. For example, each of the first edge 330E1 and the second edge 330E2 may extend from the first connection area 330CA1 to the overlapping area 330OA in the first direction (e.g., the x direction or the −x direction). In an embodiment, each of the first edge 330E1 and the second edge 330E2 may extend in the overlapping area 330OA in the first direction (e.g., the x direction or the −x direction). Advantageously, a visible stain potentially caused by pressure on the display panel 100 may be prevented or reduced.

Figure 14:
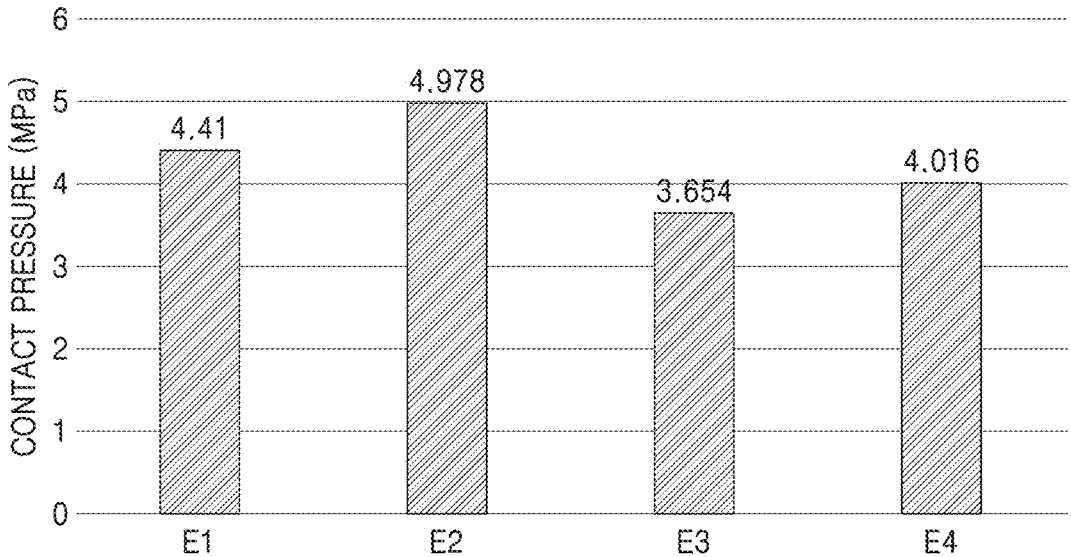
FIG. 14 is a graph showing simulation results of contact pressure applied to a display panel, according to various embodiments.

FIG. 14 is a graph showing simulation results of contact pressure applied to a display panel, according to various embodiments.

Referring to FIG. 14, E1 is a simulation result of contact pressure applied to a display panel described with reference to FIG. 13A. The contact pressure applied to the display panel described with reference to FIG. 13A was about 4.41 MPa.

E2 is a simulation result of contact pressure applied to a display panel in an embodiment described with reference to FIG. 13B. The contact pressure applied to the display panel in the embodiment described with reference to FIG. 13B was about 4.987 MPa.

E3 is a simulation result of contact pressure applied to a display panel described with reference to FIG. 13C. The contact pressure applied to the display panel in the embodiment described with reference to FIG. 13C was about 3.654 MPa. The contact pressure in the display panel described with reference to FIG. 13C is less than the contact pressure in the display panel described with reference to FIG. 13A. The contact pressure in the display panel described with reference to FIG. 13C is about 82.8% of the contact pressure in the display panel described with reference to FIG. 13A.

E4 is a simulation result of contact pressure applied to a display panel described with reference to FIG. 13D. The contact pressure applied to the display panel described with reference to FIG. 13D was about 4.016 MPa. The contact pressure in the display panel described with reference to FIG. 13D is less than the contact pressure in the display panel described with reference to FIG. 13A. The contact pressure in the display panel described with reference to FIG. 13D is about 91% of the contact pressure in the display panel described with reference to FIG. 13A.

As described above, a display apparatus according to an embodiment may include an adhesive pattern located between a cover panel and a sensing circuit board and having a width equal to or less than a distance between a first edge and a second edge of the sensing circuit board. Advantageously, a visible stain in an active area of a display panel potentially resulted from pressure exerted by a fingerprint sensor assembly may be prevented or reduced.

Also, in the display apparatus according to an embodiment, the sensing circuit board may include a first connection area overlapping a fingerprint sensor and an overlapping area extending from the first connection area and at least partially overlapping a second cover surface of the cover panel, and may include the first edge extending from the first connection area to the overlapping area in one direction and the second edge whose at least a part extends from the first connection area to the overlapping area to be closer to the first edge. Advantageously, a visible stain in an active area of the display panel potentially resulted from pressure exerted by the fingerprint sensor assembly may be prevented or reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:

1. A display apparatus comprising:
   a display panel comprising a first surface and a second surface that is opposite the first surface;
   a cover panel in which an opening portion is defined to overlap the second surface of the display panel, the cover panel comprising a first cover surface facing the second surface of the display panel and a second cover surface opposite the first cover surface;
   a fingerprint sensor assembly comprising a fingerprint sensor located in the opening portion, and a sensing circuit board electrically connected to the fingerprint sensor, extending from the fingerprint sensor to a side of the opening portion and from the side of the opening portion to the second cover surface of the cover panel, and comprising a first edge and a second edge that are opposite each other; and
   an adhesive pattern located on the second cover surface between the cover panel and the sensing circuit board, and having a width equal to or less than a distance between the first edge and the second edge,
   wherein the sensing circuit board is attached to the fingerprint sensor at a first distance from the display panel,
   wherein the sensing circuit board is attached to the adhesive pattern at a second distance from the display panel, and
   wherein the second distance is greater than the first distance.

2. The display apparatus of claim 1, wherein the cover panel further comprises an inner surface defining the opening portion and connected to the first cover surface and the second cover surface of the cover panel,
   wherein a side surface of the adhesive pattern that is an edge of the adhesive pattern is connected to the inner surface of the cover panel.

3. The display apparatus of claim 1, wherein the sensing circuit board comprises a first connection area overlapping the fingerprint sensor,
   wherein a distance between the display panel and the sensing circuit board in the first connection area is less than a distance between the display panel and the sensing circuit board on the second cover surface of the cover panel.

4. The display apparatus of claim 1, wherein the sensing circuit board comprises a first connection area overlapping the fingerprint sensor, an overlapping area extending from the first connection area and at least partially overlapping the adhesive pattern, and a first area extending from the overlapping area and in which each of the first edge and the second edge has a curved shape.

5. The display apparatus of claim 4, wherein the sensing circuit board further comprises a second area extending from the first area in one direction,
   wherein the overlapping area extends in one direction, and
   in the first area, each of the first edge and the second edge extends in a semicircular shape.

6. The display apparatus of claim 4, wherein, in the overlapping area, each of the first edge and the second edge extends in a curved shape,
   wherein, in the overlapping area, a curvature of the first edge is greater than a curvature of the second edge, and
   in the first area, a curvature of the first edge is less than a curvature of the second edge.

7. The display apparatus of claim 4, further comprising a main circuit board connected to the display panel and the fingerprint sensor assembly, wherein the sensing circuit board further comprises a first intermediate area extending from the first area in one direction, a second intermediate area extending from the first intermediate area and in which each of the first edge and the second edge has a curved shape, a second area extending from the second intermediate area in one direction, a third area extending from the second area and in which each of the first edge and the second edge has a curved shape, and a second connection area extending from the third area and connected to the main circuit board.

8. The display apparatus of claim 4, wherein at least one of the first edge and the second edge of the sensing circuit board extends from the first connection area to the overlapping area in one direction.

9. The display apparatus of claim 8, wherein, in the first area, a curvature of the first edge is less than a curvature of the second edge, wherein the first edge extends from the first connection area to the overlapping area, and at least a part of the second edge extends from the first connection area to the overlapping area to be closer to the first edge.

10. The display apparatus of claim 1, wherein the cover panel comprises a plurality of layers, wherein the adhesive pattern is located between the sensing circuit board and the plurality of layers.

11. A display apparatus comprising:

a display panel comprising a first surface and a second surface that is opposite the first surface;

a cover panel in which an opening portion is defined to overlap the second surface of the display panel, the cover panel comprising a first cover surface facing the second surface and a second cover surface opposite the first cover surface;

a fingerprint sensor assembly comprising a fingerprint sensor located in the opening portion, and a sensing circuit board electrically connected to the fingerprint sensor, extending from the fingerprint sensor to a side of the opening portion and from the side of the opening portion to the second cover surface of the cover panel, and comprising a first edge and a second edge that are opposite each other; and an adhesive pattern located on the second cover surface between the cover panel and the sensing circuit board, and having a width equal to or less than a distance between the first edge and the second edge, wherein the sensing circuit board comprises a first connection area overlapping the fingerprint sensor, an overlapping area extending from the first connection area and at least partially overlapping the second cover surface of the cover panel, and a first area extending from the overlapping area and in which each of the first edge and the second edge has a curved shape, wherein the first edge extends from the first connection area to the overlapping area in one direction, wherein at least a part of the second edge extends from the first connection area to the overlapping area to be closer to the first edge, wherein the sensing circuit board is attached to the fingerprint sensor at a first distance from the display panel, wherein the sensing circuit board is attached to the adhesive pattern at a second distance from the display panel, and wherein the second distance is greater than the first distance.

12. The display apparatus of claim 11, wherein, in the first area, a curvature of the first edge is less than a curvature of the second edge.

13. The display apparatus of claim 11, wherein the sensing circuit board further comprises a second area extending from the first area in one direction, wherein the overlapping area extends in one direction, and in the first area, each of the first edge and the second edge extends in a semicircular shape.

14. The display apparatus of claim 11, wherein, in the overlapping area, each of the first edge and the second edge extends in a curved shape, wherein, in the overlapping area, a curvature of the first edge is greater than a curvature of the second edge, and in the first area, a curvature of the first edge is less than a curvature of the second edge.

15. The display apparatus of claim 11, further comprising a main circuit board connected to the display panel and the fingerprint sensor assembly, wherein the sensing circuit board further comprises a first intermediate area extending from the first area in one direction, a second intermediate area extending from the first intermediate area and in which each of the first edge and the second edge has a curved shape, a second area extending from the second intermediate area in one direction, a third area extending from the second area and in which each of the first edge and the second edge of the sensing circuit board has a curved shape, and a second connection area extending from the third area and connected to the main circuit board.

16. The display apparatus of claim 11, further comprising an adhesive pattern located between the cover panel and the sensing circuit board, and having a width equal to or less than a distance between the first edge and the second edge.

17. An electronic device comprising:

a display apparatus; and a set assembly located behind the display apparatus, wherein the display apparatus comprises:

a display panel comprising a first surface and a second surface that is opposite the first surface;

a cover panel in which an opening portion is defined to overlap the second surface of the display panel, the cover panel comprising a first cover surface facing the second surface and a second cover surface opposite the first cover surface;

a fingerprint sensor assembly comprising a fingerprint sensor located in the opening portion, and a sensing circuit board electrically connected to the fingerprint sensor, extending from the fingerprint sensor to a side of the opening portion and from the side of the opening portion to the second cover surface and comprising a first edge and a second edge that are opposite each other; and an adhesive pattern located on the second cover surface between the cover panel and the sensing circuit board, and having a width equal to or less than a distance between the first edge and the second edge, wherein the sensing circuit board is attached to the fingerprint sensor at a first distance from the display panel, wherein the sensing circuit board is attached to the adhesive pattern at a second distance from the display panel, and wherein the second distance is greater than the first distance.

18. The electronic device of claim 17, wherein the cover panel further comprises an inner surface defining the opening portion and connected to the first cover surface and the second cover surface, wherein a side surface of the adhesive pattern that is an edge of the adhesive pattern is connected to the inner surface of the cover panel.

19. The electronic device of claim 17, wherein the sensing circuit board comprises a first connection area overlapping the fingerprint sensor, an overlapping area extending from the first connection area and at least partially overlapping the adhesive pattern, and a first area extending from the overlapping area and in which each of the first edge and the second edge has a curved shape, wherein, in the first area, a curvature of the first edge is less than a curvature of the second edge, wherein the first edge extends from the first connection area to the overlapping area in one direction, and at least a part of the second edge extends from the first connection area to the overlapping area to be closer to the first edge.

20. The electronic device of claim 17, wherein the set assembly comprises at least one of a bracket, an electronic module, and a battery, and at least partially overlaps the fingerprint sensor assembly.

\* \* \* \* \*